US007345706B2

(12) United States Patent
Kanayama et al.

(10) Patent No.: US 7,345,706 B2
(45) Date of Patent: Mar. 18, 2008

(54) AUTO FOCUS SYSTEM

(75) Inventors: Atsushi Kanayama, Saitama (JP); Tadashi Sasaki, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 690 days.

(21) Appl. No.: 10/642,143

(22) Filed: Aug. 18, 2003

(65) Prior Publication Data

US 2004/0036794 A1 Feb. 26, 2004

(30) Foreign Application Priority Data

Aug. 23, 2002 (JP) ............................ 2002-243360
Sep. 24, 2002 (JP) ............................ 2002-277041

(51) Int. Cl.
*H04N 5/232* (2006.01)
*G03B 13/00* (2006.01)
*G03B 3/00* (2006.01)
*G02B 7/04* (2006.01)

(52) U.S. Cl. ..................... 348/353; 348/345; 396/104; 250/201.2

(58) Field of Classification Search ................ 348/345, 348/349, 350, 354, 355, 353; 396/79, 104, 396/119; 250/201.2, 201.7
See application file for complete search history.

(56) References Cited

U.S. PATENT DOCUMENTS 4,352,545 A * 10/1982 Uno et al. .................. 396/119
4,414,575 A 11/1983 Yamamoto et al.
4,540,881 A * 9/1985 Hayashi et al. .......... 250/201.7
5,117,292 A * 5/1992 Matsunaga ............... 348/229.1
5,285,293 A * 2/1994 Webb et al. ................ 348/251
5,574,502 A * 11/1996 Haruki ....................... 348/347
6,362,851 B1 * 3/2002 Lavelle et al. ......... 348/333.01
6,636,699 B2 * 10/2003 Owada ....................... 396/104

(Continued)

FOREIGN PATENT DOCUMENTS

DE 2836428 A1 3/1980

(Continued)

OTHER PUBLICATIONS

Search Report issued from French Patent Office Jan. 6, 2005.

(Continued)

*Primary Examiner*—John M. Villecco
(74) *Attorney, Agent, or Firm*—Harness, Dickey & Pierce, P.L.C.

(57) ABSTRACT

Auto focus control is exerted based on a focus evaluation value indicating a degree of sharpness of an image obtained from a plurality of image pickup devices placed at positions of different light path lengths. There is provided a device which makes a correction on sensitivity of the focus evaluation value obtained from each image pickup devices. It is thereby possible to make an adequate correction on a sensitivity of the focus evaluation value so as to exert the auto focus control with high accuracy. It is also possible to automatically make a correction on the sensitivity of the focus evaluation value and eliminate troublesome labor. All or a part of signal processing for the auto focus control is performed by a single processing part by time-sharing. Thereby, a circuit scale can be miniaturized and power consumption can be reduced.

6 Claims, 23 Drawing Sheets

U.S. PATENT DOCUMENTS

2002/0140838 A1* 10/2002 Yoshikawa .................. 348/345

FOREIGN PATENT DOCUMENTS

| | | |
|---|---|---|
| JP | 56-074208 | 6/1981 |
| JP | 57-037336 | 3/1982 |
| JP | 57-37336 | 3/1982 |
| JP | 57-64711 | 4/1982 |
| JP | 57-072111 | 5/1982 |
| JP | 57-72111 | 5/1982 |
| JP | 57-072115 | 5/1982 |
| JP | 57-161838 | 10/1982 |
| JP | 59-184110 | 10/1984 |
| JP | 59-204807 | 11/1984 |
| JP | 61-063812 | 4/1986 |
| JP | 04-310909 | 11/1992 |
| JP | 5-232370 | 9/1993 |
| JP | 08152550 | 6/1996 |
| JP | 8-248302 | 9/1996 |
| JP | 8-320430 | 12/1996 |
| JP | 09-297258 | 11/1997 |
| JP | 10-122813 | 5/1998 |
| JP | 10-206150 | 8/1998 |
| JP | 2002-196247 | 7/2002 |

OTHER PUBLICATIONS

Japanese Office Action having dispatch date of Apr. 27, 2007, w/ English translation.

Japanese Office Action dated May 18, 2007, w/ English translation.

* cited by examiner

AUTO FOCUS SYSTEM

BACKGROUND OF THE INVENTION

1. Field of the Invention

The present invention relates to an auto focus system, and in particular, to the auto focus system for controlling a focus of a picture-taking lens by a contrast method.

2. Description of the Related Art

An auto focus control of a video camera and so on is generally depending on a contrast method. According to the contrast method, high frequency components of picture signals in a certain range (focus area) of the picture signals obtained from an image pickup device are integrated to be a focus evaluation value, and a focus adjustment is automatically performed so that the focus evaluation value becomes maximum (local maximum). It is thereby possible to obtain the best focus (focusing) for maximizing a degree of sharpness (contrast) of an image picked up by the image pickup device.

A so-called mountain climbing method is widely known as a method of setting a focus at a focusing position (a local maximum point of the focus evaluation value). According to this method, a direction in which the focus evaluation value increases is determined by comparing the focus evaluation values at two different points on moving the focus, and the focus is moved in that direction so that if the focus evaluation value turns to decrease from increase, the focus is returned to the position before the focus evaluation value decreased so as to set the focus at the local maximum point of the focus evaluation value.

In the case of the above-mentioned mountain climbing method, there is a drawback that an increasing direction of the focus evaluation value and focusing cannot be determined without actually moving the focus. Therefore, there is a proposed method whereby a focus state (front focus, rear focus or just focus) of a picture-taking lens is determinable without moving the focus by placing a plurality of image pickup devices at positions of different light path lengths (e.g., WO 02/099495 A1, WO 02/099496, WO 02/099497 A1 and WO 02/099498 A1, which were, at the time the present invention was made, not published and not publicly known). According to this focus state determination method, it is possible to immediately know a current focus state from a magnitude relation among current focus evaluation values obtained from the image pickup devices so as to determine a moving direction of the focus and the just focusing without moving the focus. Therefore, the auto focus control using this method has advantages such as being able to promptly set the focus at the focusing position.

In case of exerting auto focus control by using a plurality of image pickup devices as mentioned above, it is necessary, in order to improve accuracy of the auto focus control, to match up sensitivity of focus evaluation values (relationship between object light incident on each image pickup device and size of the focus evaluation value obtained therefor) obtained from each of the image pickup devices. To be more specific, the auto focus control is exerted on the assumption that characteristics of the image pickup devices and processing circuits for processing picture signals from the image pickup devices match up. To be precise, however, there are variations in the characteristics of the image pickup devices and processing circuits, and so it is important, for the sake of improving the accuracy of the auto focus control, to make an advance correction on the sensitivity of the focus evaluation values obtained from the image pickup devices.

The focus evaluation values can be obtained by performing the same process to the picture signals from a plurality of focus state determining image pickup devices, respectively. However, if that process is performed in parallel by the processing circuits provided corresponding to the picture signals, images of the same time are obtained from the image pickup devices, and there is a drawback that a flicker of a fluorescent lamp may occur and the circuit size and power consumption are increased although focus information from an object moving on the screen can be processed with high accuracy.

SUMMARY OF THE INVENTION

The present invention has been achieved in consideration of such circumstances, and an object thereof is to provide an auto focus system capable of, in case of exerting the auto focus control based on the focus evaluation values obtained from a plurality of image pickup devices, making an adequate correction on the sensitivity of the focus evaluation values so as to exert the auto focus control with high accuracy.

Another object is to provide the auto focus system of which processing part for obtaining the focus information from the picture signals of the image pickup devices is further rendered miniature, power-saving and low-cost.

In order to attain the above described objects, the present invention is directed to an auto focus system, comprising: a plurality of image pickup devices which pick up images of object light incident on a picture-taking lens and are arranged at positions of different light path lengths; a focus evaluation value generation device which generates a focus evaluation value indicating a degree of sharpness of the image picked up by each of the image pickup devices; a corrector which makes a correction on sensitivity of the focus evaluation value obtained from each of the image pickup devices so that the sensitivity be match up; and a focus control device which moves a focus of the picture-taking lens to a focusing position according to the focus evaluation values.

In an aspect of the present invention, a value obtained by, for each focus evaluation value obtained from each of the image pickup devices, multiplying a variation of the focus evaluation value from a predetermined reference value by a predetermined gain is the focus evaluation value used for controlling the focus of the picture-taking lens; and the corrector makes a correction on the sensitivity by setting the reference value and the gain at appropriate values, and comprises: a reference value setting device which sets as the reference value the focus evaluation value obtained from each of the image pickup devices in a case where an image having no contrast is picked up; and a gain setting device which sets the gain so that a maximum value of the focus evaluation value obtained from each of the image pickup devices matches up in a case where the focus of the picture-taking lens is moved.

Preferably, the corrector automatically makes a correction on the sensitivity at least one of at a time of turning on a predetermined switch, at power-on, and on initialization before shipment.

Preferably, the corrector stores the reference value and gain set by the reference value setting device and the gain setting device as correction data in a memory.

Preferably, the reference value setting device has the image having no contrast picked up by each of the image pickup devices by closing an iris of the picture-taking lens.

Preferably, at the time of having the gain set by the gain setting device, the corrector moves the focus in a state in which a zoom of the picture-taking lens is set at a predetermined position.

Preferably, the gain setting device moves the focus of the picture-taking lens at high speed to check existence of the maximum value of the focus evaluation value obtained from each of the image pickup devices, and then moves the focus at a low speed to accurately determine the maximum value.

Preferably, the auto focus system further comprises an indicator which indicates that the corrector is just making a correction on the sensitivity.

According to the present invention, there is provided the corrector which makes a correction on the sensitivity of the focus evaluation value obtained from each of the above described image pickup devices so that it can make an adequate correction on the sensitivity of the focus evaluation value and exert the auto focus control with high accuracy. It can also automatically make a correction on the sensitivity of the focus evaluation value so as to eliminate troublesome labor.

In order to attain the above described objects, the present invention is also directed to an auto focus system comprising: a plurality of image pickup devices which pick up images of object light incident on a picture-taking lens and are arranged at positions of different light path lengths; a focus controller which controls a focus of the picture-taking lens according to a picture signal obtained by each of the image pickup devices to automatically focus; and a single processing part for, as to each picture signal from each of the image pickup devices, performing all or a part of the same process performed to each picture signal by time-sharing.

Preferably, an AF frame is set as a frame for identifying a range to be focused on in an angle of view of the picture-taking lens; and the processing part switches the picture signals to be processed to the picture signals from another image pickup device each time the processing part finishes at least the process of the picture signals in the AF frame, of the picture signals from one image pickup device.

Preferably, an AF frame is set as a frame for identifying a range to be focused on in an angle of view of the picture-taking lens; and the processing part switches the picture signals to be processed to the picture signals from another image pickup device each time the processing part finishes the process of a part of the picture signals, of the picture signals in the AF frame from one image pickup device.

Preferably, the auto focus system further comprises: a storage device which stores the picture signals from each of the image pickup devices, wherein the processing part reads from the storage device and processes the picture signals outputted from the image pickup devices at the same time.

Preferably, the picture signals to be processed are switched in reference to a horizontal sync signal.

Preferably, a vertical sync signal of the picture signals from each of the image pickup devices is deviated for a certain period of time.

According to the present invention, all or a part of the auto focus control using the plurality of image pickup devices placed at the positions of different light path lengths is exerted by the single processing part by the time-sharing so that a circuit scale can be miniaturized and the power consumption can be reduced.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereafter, preferred embodiments of an auto focus system according to the present invention will be described in detail according to the attached drawings.

Figure 1:
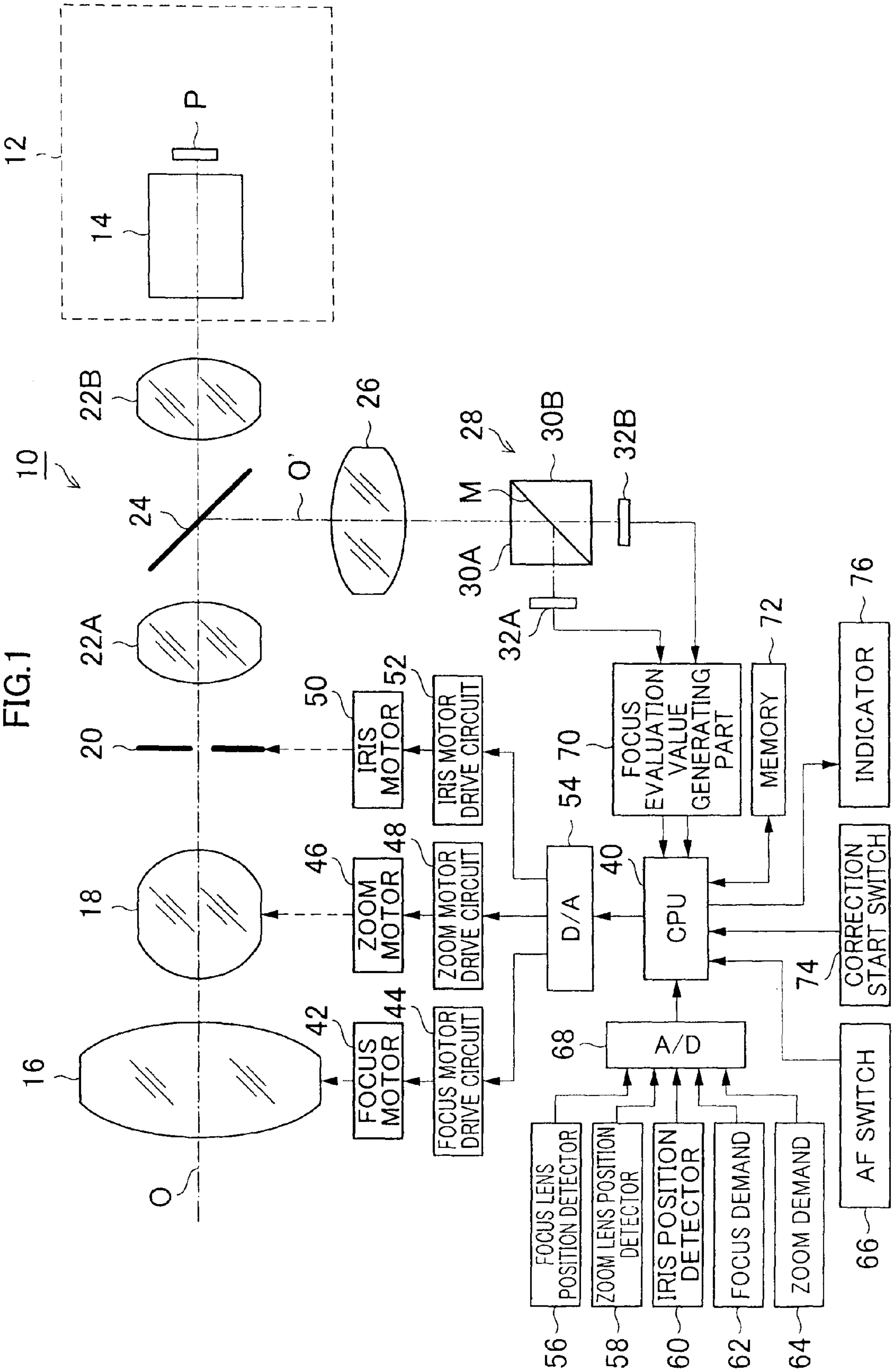
FIG. 1 is a block diagram of a TV camera system to which an auto focus system according to the present invention is applied.

FIG. 1 is a block diagram of a TV camera system to which the auto focus system according to an embodiment of the present invention is applied. As shown in FIG. 1, this TV camera system is comprised of a lens apparatus 10, a camera body 12 and so on. The camera body 12 has image pickup devices (hereafter, referred to as video image pickup devices) for shooting an image for broadcasting and outputting or recording on a record medium a picture signal in a predetermined format, necessary circuits and so on mounted thereon.

The lens apparatus 10 is detachably mounted on the camera body 12, and is mainly comprised of an optical system (picture-taking lens) and a control system. First, to describe a configuration of the picture-taking lens, it has a focus lens (group) 16, a zoom lens (group) 18, an iris 20, a relay lens (relay optical system) comprised of a front side relay lens 22A and a back side relay lens 22B. A semitransparent mirror 24 for branching object light for determining a focus state from the object light incident on the picture-taking lens is placed between the front side relay lens 22A and back side relay lens 22B of the relay optical system.

The semitransparent mirror 24 is mounted to be inclined approximately 45 degrees to the optical axis O of the picture-taking lens so that a part of the object light (light volume of ⅓ for instance) which passed through the front side relay lens 22A is reflected thereon at a right angle as the object light for determining the focus state.

The object light transmitted through the semitransparent mirror 24 is emitted as the object light for the image from a back end side of the picture-taking lens, and then gets incident on an image pickup part 14 of the camera body 12. The configuration of the image pickup part 14 will be omitted. The object light which got incident on the image pickup part 14 is decomposed into three colors of red light, green light and blue light by a color separation optical system for instance, and gets incident on an image pickup surface of the video image pickup device of each color. Thus, a color image for broadcasting is shot. A focus surface P in the drawing is an optically equivalent position to the image pickup surface of each video image pickup device shown on the optical axis O of the picture-taking lens.

The object light reflected on the semitransparent mirror 24 proceeds along the optical axis O' which is vertical to the optical axis O as the object light for determining the focus state, and then gets incident on a relay lens 26. It is collected by the relay lens 26 and then gets incident on a focus state determination part 28.

The focus state determination part 28 is comprised of two prisms 30A, 30B constituting a light division optical system and a pair of image pickup devices for determining the focus state 32A, 32B (hereafter, referred to as focus state determining image pickup devices 32A, 32B).

As described above, the object light reflected on the semitransparent mirror 24 proceeds along an optical axis O', and gets incident on the first prism 30A. It is equally divided into reflected light and transmitted light on a semitransparent mirror surface M of the first prism 30A. The reflected light thereof gets incident on the image pickup surface of the focus state determining image pickup device 32A on one side, and the transmitted light gets incident on the focus state determining image pickup device 32B on the other side. Each image pickup surface of the focus state determining image pickup devices 32A and 32B has the light volume of ⅙ of the entire object light incident on the picture-taking lens incident thereon, for instance.

Figure 2:
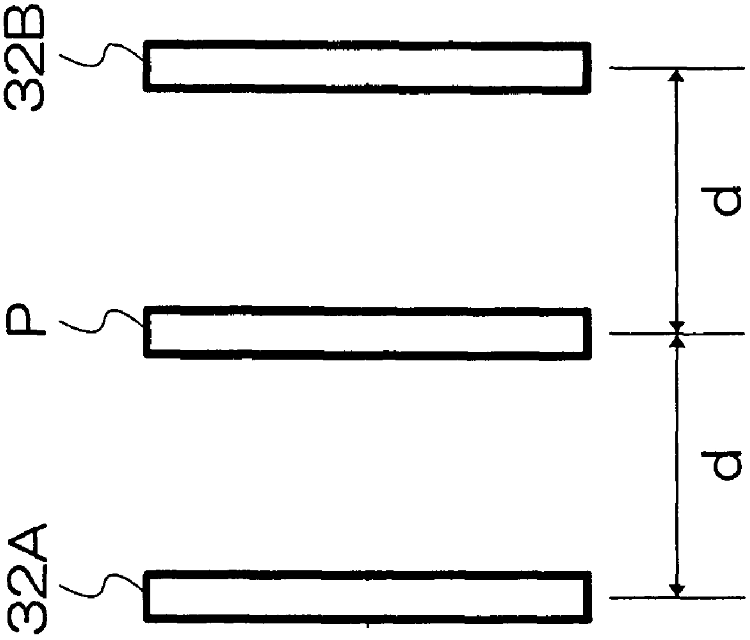
FIG. 2 is a diagram showing an optical axis of object light incident on a video image pickup device and the optical axis of object light incident on a pair of focus state determining image pickup devices on the same straight line.

FIG. 2 is a diagram showing the optical axis of the object light incident on the video image pickup device of the camera body 12 and the optical axis of the object light incident on the pair of focus state determining image pickup devices 32A, 32B on the same straight line. As shown in FIG. 2, the light path length of the object light incident on the focus state determining image pickup device 32A on one side is set to be shorter than that incident on the focus state determining image pickup device 32B on the other side, and the light path length of the object light incident on the image pickup surface (focus surface P) of the video image pickup device is set to have an intermediate length between them. To be more specific, the pair of focus state determining image pickup devices 32A, 32B (image pickup surfaces thereof) are placed to have an equal distance (d) frontward and backward from the image pickup surface (focus surface P) of the video image pickup device, respectively.

Therefore, the object light for determining the focus state branched by the semitransparent mirror 24 has the image thereof picked up at the equal distance (d) frontward and backward from the image pickup surface (focus surface P) of the video image pickup device by the pair of focus state determining image pickup devices 32A, 32B. As will be described later, the focus state determining image pickup devices 32A, 32B obtain the picture signal for determining the focus state (auto focus control), and they are CCDs for picking up a black and white image according to this embodiment since they do not need to pick up a color image.

To describe the control system of the lens apparatus 10 next, the focus lens 16, zoom lens 18 and iris 20 are linked to a focus motor 42, a zoom motor 46 and an iris motor 50 shown in FIG. 1 via a power transmission mechanism (not shown), respectively. If the focus motor 42 is driven, the focus lens 16 moves in an optical axis direction to change a focus position (shooting distance) of the picture-taking lens. If the zoom motor 46 is driven, the zoom lens 18 moves in the optical axis direction to change zoom magnification of the picture-taking lens. If the iris motor 50 is driven, a diaphragm blade of the iris 20 opens and closes to change a diaphragm diameter (diaphragm value).

The motors 42, 46 and 50 are given drive voltages from a focus motor drive circuit 44, a zoom motor drive circuit 48 and an iris motor drive circuit 52, respectively. The drive circuits 44, 48 and 52 are given control signals from a CPU 40 mounted on the lens apparatus 10 via a D/A converter 54.

The control signals outputted from the CPU 40 indicate voltage values corresponding to rotational speeds of the motors to be driven, that is, working speeds of subjects to be driven (focus lens 16, zoom lens 18 and iris 20). If the voltage values are converted into analog signals by the D/A converter 54 and given to the corresponding drive circuits 44, 48 and 52, the voltages are amplified by the drive circuits 44, 48 and 52, and the amplified voltages are applied as the drive voltages to the corresponding motors 42, 46 and 50. Thus, the rotational speeds of the motors 42, 46 and 50 are controlled by the CPU 40.

Current positions of the focus lens 16, zoom lens 18 and iris 20 are determined by a focus lens position detector 56, zoom lens position detector 58 and an iris position detector

60 such as potentiometers, respectively, and determination signals determined from the position detectors 56, 58 and 60 are given to the CPU 40 via an A/D converter 68.

Therefore, as for the process of the CPU 40, it is possible, by controlling the rotational speeds of the motors 42, 46 and 50 as described above, to control the working speeds of the focus lens 16, zoom lens 18 and iris 20 to be desirable speeds. It is also thereby possible to control setup positions of the focus lens 16, zoom lens 18 and iris 20 to be desirable setup positions by controlling the rotational speeds of the motors 42, 46 and 50 while reading the current positions of the focus lens 16, zoom lens 18 and iris 20 by means of the determination signals from the position detectors 56, 58 and 60.

In general, the focus and zoom of the picture-taking lens can be manually controlled by an operator by connecting a controller such as a focus demand 62 and/or a zoom demand 64 to the lens apparatus 10. For instance, the focus demand 62 outputs a focus instruction signal (focus demand data) of the voltage corresponding to a rotational position of a manual operating member (focus ring), which is given to the CPU 40 via the A/D converter 68. For instance, by rendering the value of the focus demand data as the value indicating a moving target position of the focus lens 16, the CPU 40 outputs via the D/A converter 54 to the focus motor drive circuit 44, as described above, the control signal for providing an instruction to move at a moving speed according to a difference between the moving target position and the current position (focus position data) obtained from the focus lens position detector 56. Thus, the focus lens 16 moves to the moving target position as instructed by the focus demand 62 and stops.

The zoom demand 64 generally provides to the CPU 40 the voltage corresponding to a rotational position of an operating member (e.g., a thumb ring) as the value indicating a moving target speed of the zoom lens 18, and the CPU 40 outputs to the zoom motor drive circuit 48 the control signal for providing an instruction to move at that moving target speed so as to move the zoom lens 18 at the moving target speed as instructed by the zoom demand 64. As for the iris 20, the camera body 12 generally provides to the CPU 40 the instruction signal for directing an operation target position of the iris 20, and the CPU 40 controls the position of the iris 20 to be at that operation target position.

As for focus control of the picture-taking lens, there are manual focus (MF) control using the focus demand 62 and auto focus (AF) control based on the picture signals from the focus state determining image pickup devices 32A, 32B. An AF switch 66 for switching between such MF control and AF control is provided to the lens apparatus 10 or the focus demand 62. An on/off state of the AF switch 66 is determined by the CPU 40, and the MF control is exerted in the case where the AF switch 66 is off so that, as described above, the focus lens 16 is controlled based on the focus instruction signal (focus demand data) from the focus demand 62.

In the case where the AF switch 66 is turned on, the AF control is exerted. To be more specific, the images (pictures) picked up by the pair of focus state determining image pickup devices 32A, 32B are outputted as the picture signals for sequentially transmitting each pixel value thereof along a plurality of scan lines (horizontal lines) constituting one screen, and are inputted to a focus evaluation value generating part 70. Although the configuration and process of the focus evaluation value generating part 70 will be described later, the focus evaluation value generating part 70 generates from the inputted picture signals the focus evaluation value indicating whether a contrast (degree of sharpness) of each image picked up by the focus state determining image pickup devices 32A, 32B is high or low so as to provide the generated focus evaluation values to the CPU 40. The focus evaluation value generated based on the picture signal from the focus state determining image pickup device 32A is called the focus evaluation value of a channel A (chA), and the focus evaluation value generated based on the picture signal from the focus state determining image pickup device 32B is called the focus evaluation value of a channel B (chB). As will be described in detail later, the CPU 40 obtains the focus evaluation values of the chA and chB obtained from the focus evaluation value generating part 70, and determines the focus state (front focus, rear focus or focusing) of the picture-taking lens based on the obtained focus evaluation values and also controls the position of the focus lens 16 so that the focus state of the picture-taking lens will be focusing.

In this drawing, for instance, a memory 72 is a nonvolatile memory for storing the after-mentioned correction data for making a correction on the sensitivity of the focus evaluation value and so on, a correction start switch 74 is a switch for directing a start of that correction, and an indicator 76 is an indication device such as an LED for indicating that the correction is just being performed.

Figure 3:
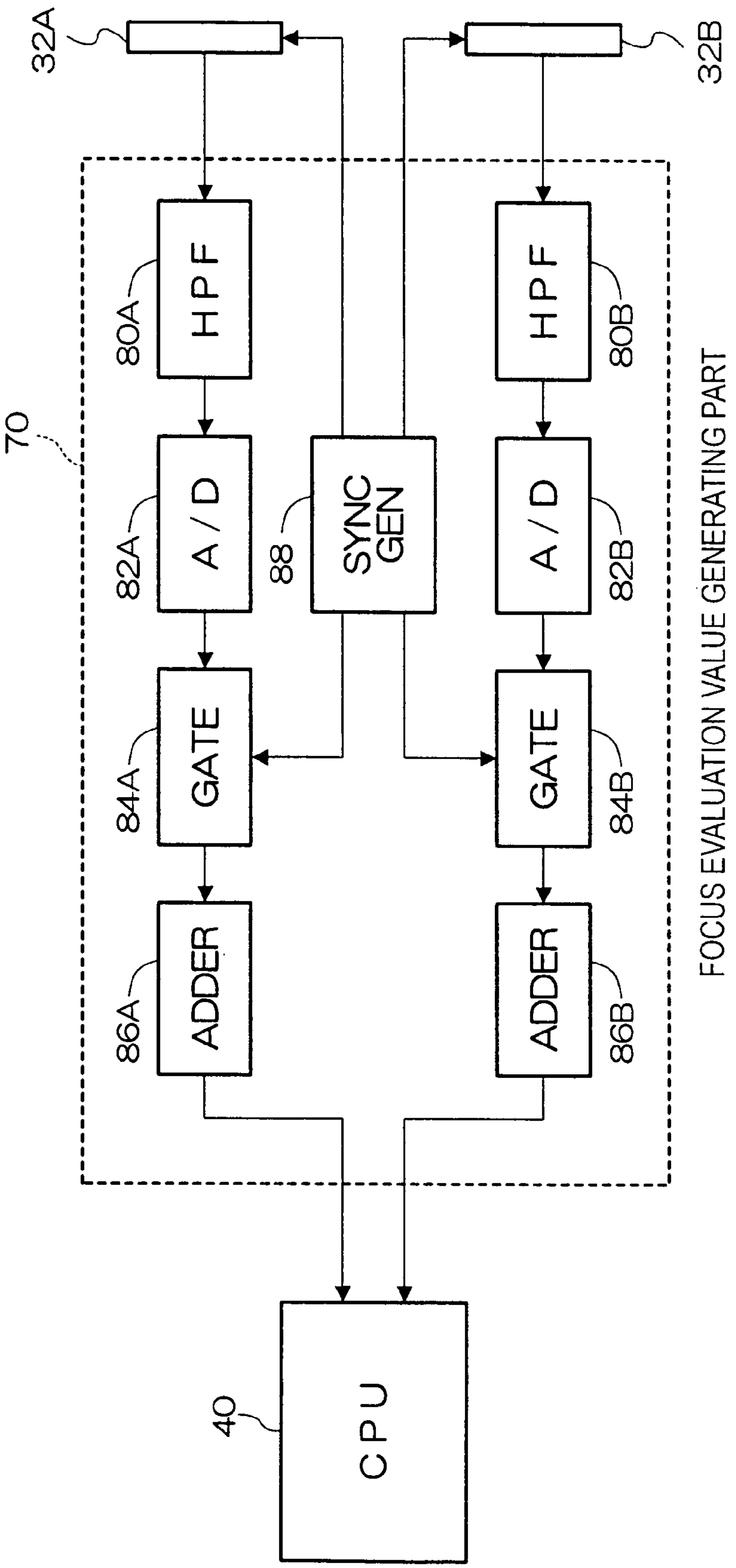
FIG. 3 is a block diagram showing a configuration of a focus evaluation value generating part.

The AF control in the camera system constituted as above will be described in detail hereafter. First, the configuration and process of the focus evaluation value generating part 70 will be described. As shown in FIG. 3, the picture signal outputted from each of the focus state determining image pickup devices 32A, 32B is inputted to high-pass filters (HPFs) 80A, 80B of the focus evaluation value generating part 70. Here, both the focus state determining image pickup devices 32A and 32B are the CCDs for picking up the black and white image, and so the picture signal outputted from each of the focus state determining image pickup devices 32A and 32B is a luminance signal indicating a luminance value of the pixels constituting each screen.

The picture signals inputted to the HPFs 80A, 80B have high frequency components thereof extracted by the HPFs 80A, 80B, and the signals of the high frequency components are subsequently converted into digital signals by A/D converters 82A, 82B. Of the digital signals of one screen (equivalent to one field) of the images picked up by the focus state determining image pickup devices 32A, 32B, only the digital signals corresponding to the pixels in a predetermined focus area (the central part of the screen, for instance) are extracted by gate circuits 84A, 84B so that the values of the digital signals in an extracted range are added by adders 86A, 86B. Thus, a total of the high frequency component values of the picture signals in the focus area is acquired. The values acquired by the adders 86A, 86B are the focus evaluation values indicating whether the degree of sharpness of the images in the focus area is high or low. The focus evaluation values acquired by the adder 86A are provided to the CPU 40 as the focus evaluation values of the channel A (chA), and the focus evaluation values acquired by the adder 86B are provided thereto as the focus evaluation values of the channel B (chB).

Various synchronization signals are provided to the focus state determining image pickup devices 32A, 32B and the circuits such as gate circuits 84A, 84B from a synchronization signal generating circuit 88 shown in FIG. 3, and synchronization of the processing of the circuits is implemented. The synchronization signal generating circuit 88 provides to the CPU 40 a vertical sync signal (V signal) per field of the picture signal.

Next, a description will be given of determination of the focus state and control over the focus (focus lens 16) based on the focus evaluation values. It is possible, by the focus evaluation values of the chA and chB obtained from the focus evaluation value generating part 70 as described above, to determine the current focus state of the picture-taking lens against the image pickup surface (focus surface P) of the video image pickup device.

Figure 4:
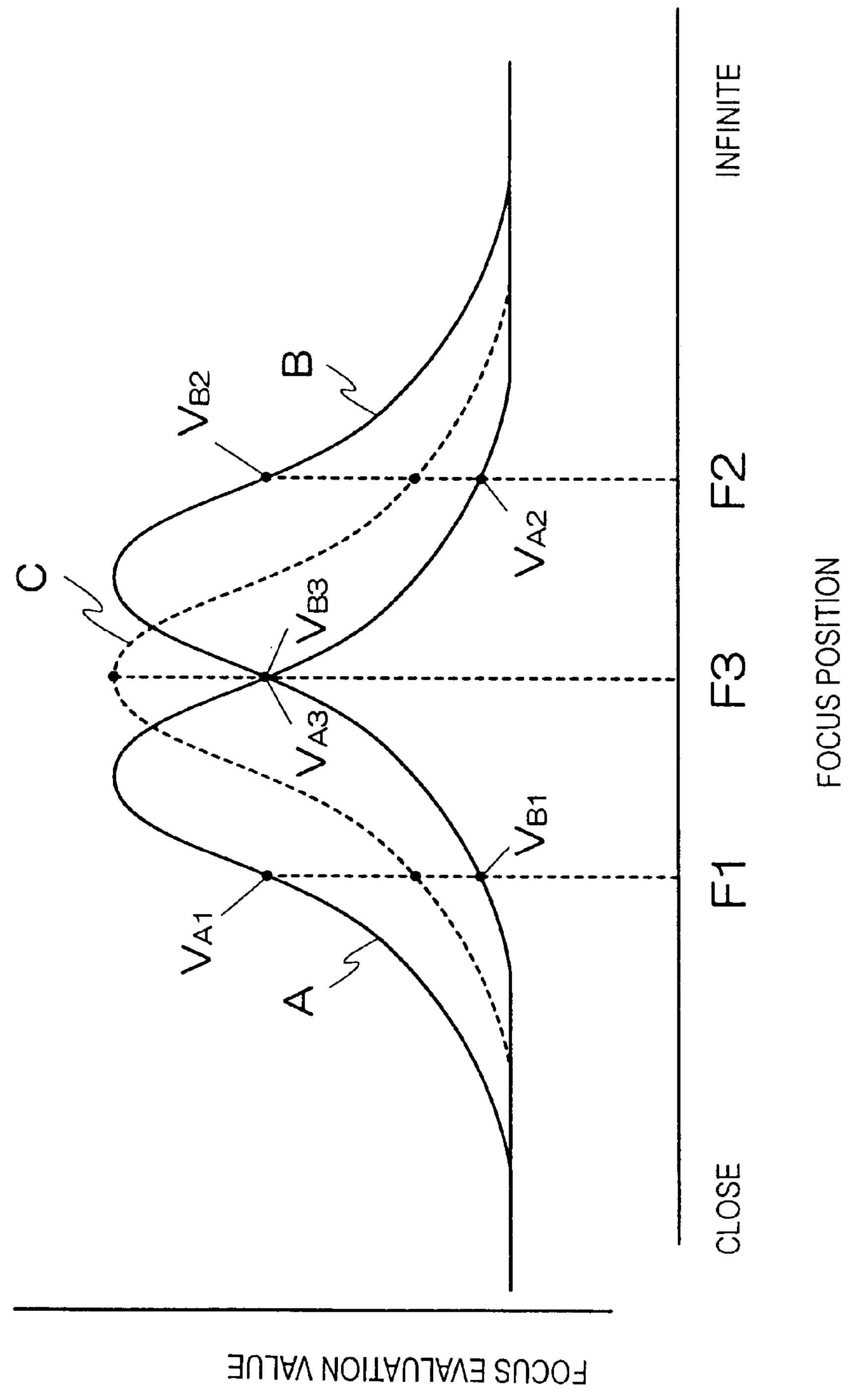
FIG. 4 is a diagram showing an appearance of the focus evaluation values against focus positions when shooting a certain object by taking focus positions of a picture-taking lens as a horizontal axis and the focus evaluation values as a vertical axis.

FIG. 4 is a diagram showing an appearance of the focus evaluation values against the focus positions when shooting a certain object by taking the positions of the focus lens 16 of the picture-taking lens (focus positions) as a horizontal axis and the focus evaluation values as a vertical axis. A curve C shown by a dotted line in the drawing shows the focus evaluation values against the focus positions on the assumption that the focus evaluation values were acquired by the picture signals from the video image pickup devices (or the image pickup devices placed at positions coupled to the video image pickup devices). Curves A and B shown in solid line in the drawing show the focus evaluation values of the chA and chB obtained from the focus state determining image pickup devices 32A, 32B, respectively, against the focus positions. In FIG. 4, a position F3 at which the focus evaluation value of the curve C becomes maximum (local maximum) is the focusing position.

In the case where the focus position of the picture-taking lens is set at F1 in FIG. 4, the focus evaluation value $V_{A1}$ of chA becomes the value corresponding to the position F1 of the curve A, and the focus evaluation value $V_{B1}$ of chB becomes the value corresponding to the position F1 of the curve B. In this case, the focus evaluation value $V_{A1}$ of chA becomes larger than the focus evaluation value $V_{B1}$ of chB, which shows that the focus position is set on a closer side than the focusing position (F3), that is, a state of the front focus.

In the case where the focus position of the picture-taking lens is set at F2 in FIG. 4, the focus evaluation value $V_{A2}$ of chA becomes the value corresponding to the position F2 of the curve A, and the focus evaluation value $V_{B2}$ of chB becomes the value corresponding to the position F2 of the curve B. In this case, the focus evaluation value $V_{A2}$ of chA becomes smaller than the focus evaluation value $V_{B2}$ of chB, which shows that the focus position is set on a more infinite side than the focusing position (F3), that is, a state of the rear focus.

As opposed to this, in the case where the focus position of the picture-taking lens is set at F3, that is, the focusing position, the focus evaluation value $V_{A3}$ of chA becomes the value corresponding to the position F3 of the curve A, and the focus evaluation value $V_{B3}$ of chB becomes the value corresponding to the position F3 of the curve B. In this case, the focus evaluation value $V_{A3}$ of chA becomes equal to the focus evaluation value $V_{B3}$ of chB, which shows that the focus position is set at the focusing position (F3).

Thus, it is possible, by the focus evaluation values of the chA and chB obtained from the focus evaluation value generating part 70, to determine whether the current focus state of the picture-taking lens is the front focus, rear focus or focusing.

Therefore, it is possible to move the focus lens 16 to the focusing position by controlling the position of the focus lens 16 based on the focus evaluation values of the chA and chB obtained from the focus evaluation value generating part 70. To be more specific, in the case where the focus evaluation values of the chA and chB are in the state to be determined as the front focus, the focus lens 16 is moved in the infinite direction. In the case where they are in the state to be determined as the rear focus, it is moved in the close direction. In the case where they are in the state to be determined as the focusing, the focus lens 16 can be moved to the focusing position by stopping it at that position.

The process of the CPU 40 corresponding to the above description will be concretely described as follows. Assuming that the focus evaluation value of chA obtained from the focus evaluation value generating part 70 is AFV_A, and that of chB is AFV_B, in the case of AFV_A>AFV_B which means the state of the front focus, the CPU 40 changes a currently set moving target position of the focus lens 16 toward the infinite side by a travel distance (positive value) mentioned later, and outputs to the focus motor drive circuit 44 via the D/A converter 54 the control signal for moving the focus lens 16 to the new moving target position. Inversely, in the case of AFV_A<AFV_B which means the state of the rear focus, the CPU 40 changes a currently set moving target position of the focus lens 16 toward the close side by the travel distance (negative value) mentioned later, and outputs to the focus motor drive circuit 44 via the D/A converter 54 the control signal for moving the focus lens 16 to the new moving target position. This process is repeated, and in the case where it becomes AFV_A=AFV_B, the movement of the focus lens 16 is stopped. Thus, the focus lens 16 moves to the focusing position.

Here, assuming that value of the determination signal (focus position data) indicating the current position of the focus lens 16 obtained from the focus lens position detector 56 is F_POSI, and the moving target position of the focus lens 16 set as described above is AF_CTRL, the CPU 40 sets the value of the moving target position AF_CTRL minus the current position F_POSI, that is, AF_CTRL—F_POSI as the value F_SPEED of the control signal to be outputted to the focus motor drive circuit 44. The control signal to be outputted to the focus motor drive circuit 44 is the value corresponding to the rotational speed of the focus motor 42 (moving speed of the focus lens 16) to be directed to the focus motor drive circuit 44. The value F_SPEED of the control signal set as described above is outputted to the focus motor drive circuit 44 so that the focus lens 16 moves at the speed corresponding to the difference between the moving target position AF_CTRL and the current position F_POSI (AF_CTRL—F_POSI).

Next, a description will be given of the travel distance to be added to the current moving target position in the case of setting the new moving target position of the focus lens 16 as described above. As described above, the difference between the current position F_POSI and the moving target position AF_CTRL of the focus lens 16 is corresponding to the moving speed of the focus lens 16. When setting the new moving target position AF_CTRL, the larger the travel distance to be added to the current moving target position is, the higher the moving speed of the focus lens 16 becomes, and the smaller the travel distance is, the lower the moving speed becomes.

In the case of moving the focus lens 16 to the focusing position, it is necessary, for the sake of securely stopping the focus lens 16 at the focusing position by stable operation, to lower the moving speed of the focus lens 16 by reducing the travel distance as it gets closer to the focusing position so that, when arriving at the focusing position, the travel distance becomes zero and the moving speed of the focus lens 16 becomes zero.

Thus, the CPU 40 acquires the difference ΔAFV (=AFV_A−AFV_B) between the focus evaluation values of the chA and chB, and sets as the travel distance the value ΔAFV×AFG which is the difference ΔAFV (=AFV_A−

AFV_B) multiplied by a predetermined AF gain AFG. Thus, in the case where the focus lens 16 arrives at the focusing position, that is, in the case where the difference ΔAFV between the focus evaluation values becomes zero (AFV_A=AFV_B), the travel distance ΔAFV×AFG becomes zero and the focus lens 16 stops at the focusing position. As is understandable from FIG. 4, when the focus lens 16 approaches the focusing position from around the focusing position, the difference ΔAFV between the focus evaluation values decreases and the travel distance ΔAFV×AFG gradually becomes closer to zero so that the moving speed of the focus lens 16 is gradually reduced.

Instead of setting as the travel distance the value ΔAFV×AFG which is the difference ΔAFV between the focus evaluation values of the chA and chB multiplied by the predetermined AF gain AFG as described above, it is also possible to set the travel distance as follows. To be more specific, the CPU 40 first acquires a ratio ΔAFV=AFV_A/AFV_B between the focus evaluation value AFV_A of the chA and the focus evaluation value AFV_B of chB. In the case of AFV_A>AFV_B (ΔAFV>1) which means the state of the front focus (refer to FIG. 4), the travel distance is set as (ΔAFV−1)×AFG. AFG indicates the value of the predetermined AF gain. In the case of AFV_A≦AFV_B (ΔAFV≦1) which means the state of the rear focus (or the state of just focus), the travel distance is set as −(1/ΔAFV−1)×AFG.

Thus, in the case where the focus lens 16 arrives at the focusing position, the travel distance becomes zero because it is ΔAFV=1, and the focus lens 16 stops at the focusing position. When the focus lens 16 approaches the focusing position from around the focusing position, (ΔAFV−1) or (1/ΔAFV−1) decreases and the travel distance gradually becomes closer to zero so that the moving speed of the focus lens 16 is gradually reduced. Furthermore, in the case of using the ratio ΔAFV=AFV_A/AFV_B between the focus evaluation values as an element for thus seeking the travel distance, the size of the focus evaluation value itself does not influence the travel distance (moving speed) so much so that more stable focus operation can be implemented.

Next, a description will be given as to the correction on the sensitivity of the focus evaluation values of chA and chB obtained from the focus evaluation value generating part 70. The above description was given on the assumption of the case where the sensitivity of the focus evaluation values (hereafter, referred to as focus evaluation value sensitivity) of chA and chB obtained from the focus evaluation value generating part 70 matches up. To be more specific, it is assumed that there is a match between the characteristics of the focus state determining image pickup device 32A for generating the focus evaluation value of chA and various circuits related to chA in the focus evaluation value generating part 70 and the characteristics of the focus state determining image pickup device 32B for generating the focus evaluation value of chB and various circuits related to chB in the focus evaluation value generating part 70. In reality, however, there are the cases where the focus evaluation value sensitivity does not match up, and so this embodiment describes the case where it is possible to make a correction on the sensitivity of the focus evaluation values of chA and chB obtained from the focus evaluation value generating part 70.

First, in the CPU 40, the focus evaluation value of chA obtained from the focus evaluation value generating part 70 is AFV_A0, and the focus evaluation value of chB is AFV_B0. The focus evaluation values of chA and chB at the sensitivity which is corrected, that is, the focus evaluation values to be used for the AF control (hereafter, referred to as corrected focus evaluation value sensitivity) are AFV_A and AFV_B, respectively, as described above. In this case, the corrected focus evaluation values are calculated by the following formulas.

$$AFV\_A=(AFV\_A0-AFV\_A\_\mathrm{OFFSET})\times AFG\_A \quad (1)$$

$$AFV\_B=(AFV\_B0-AFV\_B\_\mathrm{OFFSET})\times AFG\_B \quad (2)$$

The focus evaluation values AFV_A0 and AFV_B0 obtained from the focus evaluation value generating part 70 before being corrected by the formulas (1) and (2) are referred to as the focus evaluation values before the correction.

Therefore, it is possible to make a correction on the focus evaluation value sensitivity by setting the values of AFV_A_OFFSET, AFV_B_OFFSET, AFG_A and AFG_B in the formulas (1) and (2) at adequate values so as to match up the focus evaluation value sensitivity of chA and chB.

Although a concrete correction process will be described later, the above AFV_A_OFFSET and AFV_B_OFFSET (reference values) are set by the correction process at the focus evaluation values of chA and chB at a black level (focus evaluation values before the correction) obtained in a state in which the focus state determining image pickup devices 32A and 32B are light-shielded. For instance, they are set at the focus evaluation values of chA and chB obtained in a state in which the iris 20 is completely closed. However, it is not limited thereto but they may also be set at the focus evaluation values of chA and chB obtained at the time of picking up an image of a plain object (image having no contrast) for instance.

On the other hand, the above AFG_A and AFG_B (gains) are set at the values at which the corrected focus evaluation values match up based on the respective maximum values of the focus evaluation values of chA and chB obtained when the focus lens 16 is moved while shooting a predetermined object such as a chart (not necessary to be a specifically determined object).

Thus, it is possible, by using the above AFV_A_OFFSET, AFV_B_OFFSET, AFG_A and AFG_B set by the correction process, to make corrections on the focus evaluation value AFV_A0 of chA and the focus evaluation value AFV_B0 of chB obtained from the focus evaluation value generating part 70 by the formulas (1) and (2) so as to obtain the focus evaluation values AFV_A and AFV_B of chA and chB in a state in which the focus evaluation value sensitivity matches up.

The above AFV_A_OFFSET, AFV_B_OFFSET, AFG_A and AFG_B set by the correction process are stored as correction data in the memory 72 shown in FIG. 1 so that, in case of exerting the AF control, that correction data is read and used for the correction of the focus evaluation values obtained from the focus evaluation value generating part 70. The correction process is performed by turning on the correction start switch 74 shown in FIG. 1, and the indicator 76 (an LCD for instance) shown in FIG. 1 lights up while performing the correction process and goes out on finishing it. The correction start switch 74 and the indicator 76 may be mounted either on the lens apparatus 10 or on the controller such as the focus demand 62. It is also feasible, instead of performing the correction process by turning on the correction start switch 74, to perform it at power-on of the lens apparatus 10 or on initial adjustment before product shipment and store the set correction data in the memory 72.

Next, the AF control procedure in the CPU 40 will be described. First, a flow of the entire process in the CPU 40 will be described by referring to the flowchart in FIG. 5. After performing required initialization (step S10), the CPU 40 determines whether or not to start the correction of the focus evaluation value sensitivity (generation of the correction data) (step S12). As for whether or not to make a correction on the focus evaluation value sensitivity, it is determined by whether or not the correction start switch 74 is turned on as described above.

If determined as YES in the step S12, it performs the after-mentioned focus evaluation value sensitivity correction process (step S14). If determined as NO, it reads from the memory 72 the correction data already generated and stored therein (step S16).

Next, the CPU 40 performs iris control based on an iris instruction signal given by the camera body 12 (step S18). Next, it performs zoom control based on a zoom instruction signal from the zoom demand 64 (step S20).

Next, the CPU 40 determines whether or not the AF switch 66 is ON (step S22), and if determined as YES, it sets an AF start flag at ON (step S24), and then performs the focus control process (step S26). If determined as NO in the step S22, it performs the focus control process without setting the AF start flag at ON (step S26). When it finishes the focus control process in the step S26, it returns to the process in the step S18 and repeats the process from the step S18 to the step S26.

FIGS. 6 to 9 are flowcharts showing the procedure of the focus evaluation value sensitivity correction process in the step S14. In case of performing the focus evaluation value sensitivity correction, it is desirable for the operator to set the picture-taking lens in a state of shooting the chart of a high contrast as the object. First, in FIG. 6, the CPU 40 outputs the control signal to the iris motor drive circuit 52 to drive the iris motor 50, and completely closes the opening of the iris 20 (step S30). Thus, the focus state determining image pickup devices 32A and 32B are light-shielded. Subsequently, the focus evaluation value AFV_A of chA and the focus evaluation value AFV_B of chB are obtained from the focus evaluation value generating part 70 (steps S32, 34). Subsequently, it increases a count value of a focus evaluation value sampling counter by 1 (step S36), and determines whether or not a predetermined number of samplings are finished based on the count value of the sampling counter (step S38). If determined as NO, it repeats the process from step S32.

On the other hand, if determined as YES in the step S38, it determines the maximum values AFV_A_MAX and AFV_B_MAX of the focus evaluation values sampled as to chA and chB, respectively, and sets the determined maximum values AFV_A_MAX and AFV_B_MAX as the respective offset values (black level focus evaluation values) AFV_A_OFFSET and AFV_B_OFFSET of chA and chB. To be more specific, it will be as follows (step S40).

$$AFV\_A\_\mathrm{OFFSET}=AFV\_A\_\mathrm{MAX} \tag{3}$$

$$AFV\_B\_\mathrm{OFFSET}=AFV\_B\_\mathrm{MAX} \tag{4}$$

Next, the CPU 40 outputs the control signal to the iris motor drive circuit 52 to drive the iris motor 50, and opens the opening of the iris 20 (step S42). Thereby, the object light gets incident on the focus state determining image pickup devices 32A and 32B. Subsequently, the CPU 40 outputs the control signal to the zoom motor drive circuit 48 to drive the zoom motor 46, and moves the zoom lens 18 to an appropriate position (predetermined position) (step S44). It also outputs the control signal to the focus motor drive circuit 44 to drive the focus motor 42, and moves the focus lens 16 to the close end (step S46).

The position of the zoom lens 18 set in the step S44 is an adequate position for the correction of the focus evaluation value sensitivity. For instance, if it is set on the WIDE side, the focus lens 16 can be moved at high speed in the following process, and if it is set on the TELE side, an exact peak (maximum value) of the focus evaluation value can be determined in the following process, which shows the merit of each side.

Next, the CPU 40 obtains the focus evaluation value AFV_A of chA from the focus evaluation value generating part 70, and sets the obtained focus evaluation value AFV_A as AFV_A_MIN (step S48). As shown in the next flowchart in FIG. 7, the CPU 40 obtains the focus evaluation value AFV_B of chB from the focus evaluation value generating part 70, and sets the obtained focus evaluation value AFV_B as AFV_B_MIN (step S50). In the steps S48, S50 and in the following process, the focus evaluation values of chA and chB represented by AFV_A and AFV_B may be the values wherein AFV_A_OFFSET and AFV_B_OFFSET of chA and chB set in the step S40 are subtracted from the focus evaluation values obtained from the focus evaluation value generating part 70, respectively.

Next, the CPU 40 sets a moving speed F_SPEED_IST of the focus lens 16 for determining the object (step S52). It outputs the moving speed F_SPEED_IST as the control signal to the focus motor drive circuit 44 via the D/A converter 54 so as to move the focus lens 16 in the infinite direction (step S54).

While thus moving the focus lens 16 in the infinite direction, the CPU 40 obtains the focus evaluation value AFV_A of chA and the focus evaluation value AFV_B of chB from the focus evaluation value generating part 70 (steps S56, 58), and determines whether or not the respective peaks (maximum values) of the focus evaluation values of chA and chB have been determined (step S60). If determined as NO, it repeats the process from step S56.

On the other hand, if determined as YES in the step S60, the CPU 40 subsequently obtains the focus evaluation value AFV_A of chA and the focus evaluation value AFV_B of chB from the focus evaluation value generating part 70 (steps S62, S64), and determines whether or not the following formulas hold as to AFV_A_MIN and AFV_B_MIN set in the steps S48 and S50 (step S66).

$$AFV\_A \leqq AFV\_A\_\mathrm{MIN},\ \text{or} \tag{5}$$

$$AFV\_B\_\mathrm{MIN} \leqq AFV\_B\_\mathrm{MIN} \tag{6}$$

If determined as NO, it repeats the process from step S62. If determined as YES, it stops the focus lens 16 as shown in the next flowchart in FIG. 8 (step S68).

Next, the CPU 40 sets a moving speed F_SPEED_MIN (lower speed than the above F_SPEED_IST) of the focus lens 16 for determining the maximum values of the focus evaluation values with high accuracy (step S70). It outputs the moving speed F_SPEED_MIN as the control signal to the focus motor drive circuit 44 via the D/A converter 54 so as to move the focus lens 16 in the close direction (step S72).

While thus moving the focus lens 16 in the close direction, the CPU 40 obtains the focus evaluation value AFV_A of chA and the focus evaluation value AFV_B of chB from the focus evaluation value generating part 70 (step S74, S76), and searches for the respective maximum values of the focus evaluation value AFV_A of chA and the focus evaluation value AFV_B of chB so as to set the respective maximum values as AFV_A_MAX and AFV_B_MAX (step S78). It determines whether or not the maximum values of both chA and chB have been determined (step S80). If determined as NO, it repeats the process from step S74. On the other hand, if determined as YES, it stops the focus lens 16 as shown in the next flowchart in FIG. 9 (step S82).

Next, the CPU 40 determines whether or not AFV_A_MAX and AFV_B_MAX set in the step S78 meet the following formulas (step S84).

$$AFV\_A\_\mathrm{MAX} > AFV\_B\_\mathrm{MAX} \quad (7)$$

If determined as YES, it sets a correction value AFG_B in the formulas (1) and (2) at 1, and sets a correction value AFG_A as AFV_B_MAX/AFV_A_MAX (step S86). If determined as NO, it sets the correction value AFG_A in the formulas (1) and (2) at 1, and sets the correction value AFG_B as AFV_A_MAX/AFV_B_MAX (step S88).

It writes the correction values AFG_A and AFG_B set in the step S86 or S88 as the correction data on the focus evaluation values to the memory 72 (nonvolatile memory) (step S90). It also writes AFV_A_OFFSET and AFV_B_OFFSET set in the step S40 as the correction data to the memory 72. The above processing finishes the focus evaluation value sensitivity correction process.

Figure 5:
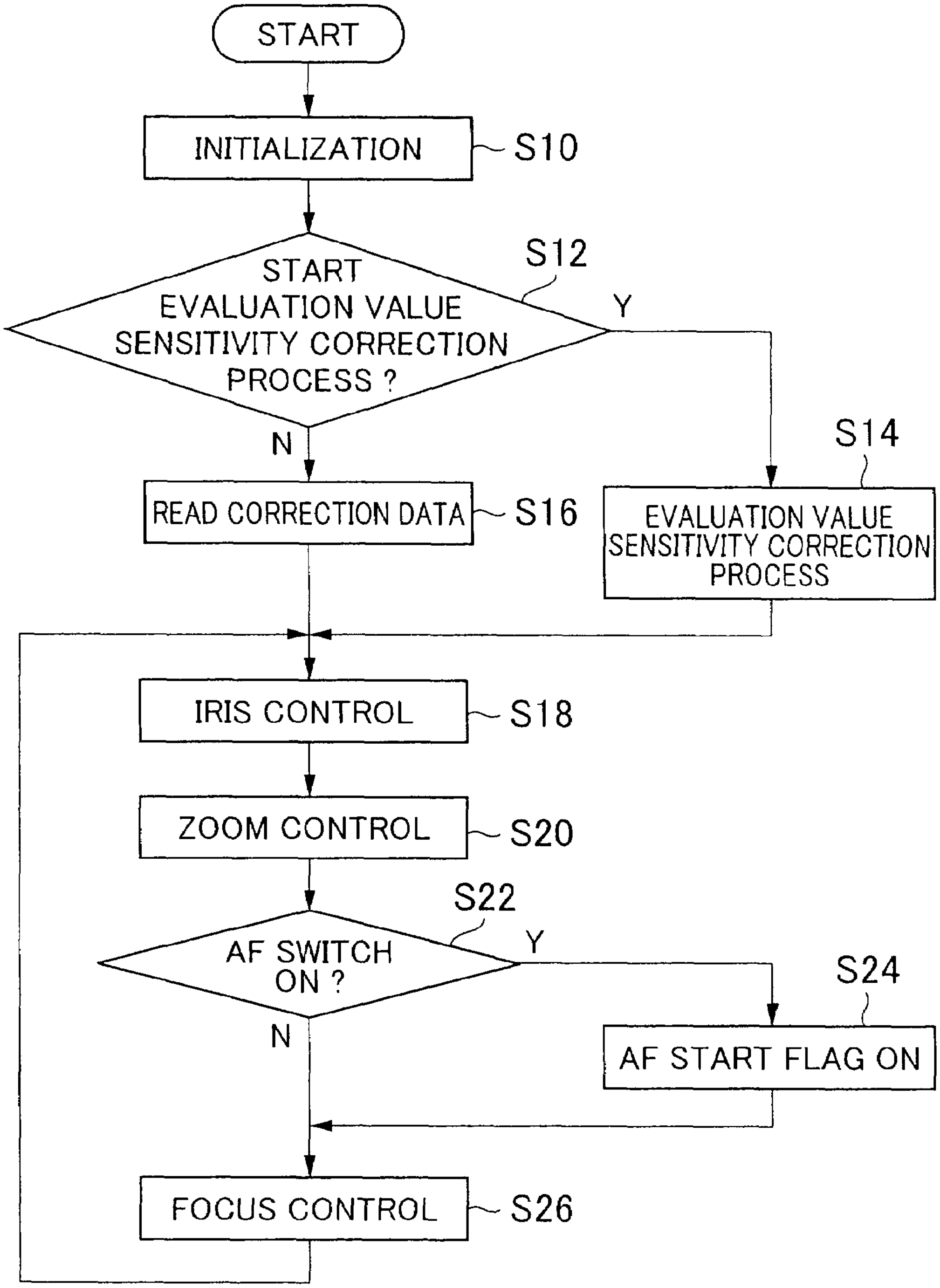
FIG. 5 is a flowchart showing a flow of the entire process in a CPU.
Figure 6:
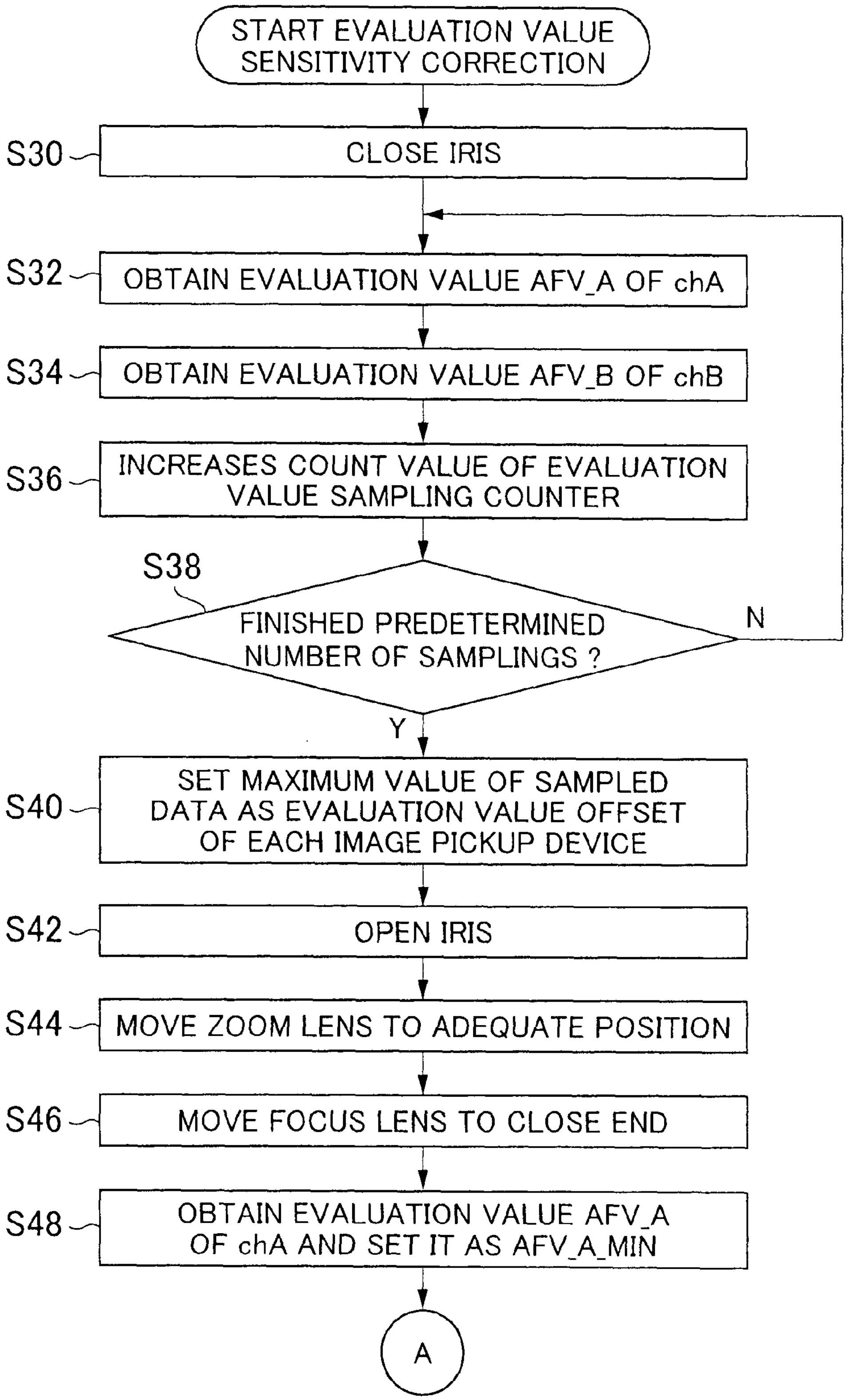
FIG. 6 is a flowchart showing a procedure of a focus evaluation value sensitivity correction process in a CPU.
Figure 7:
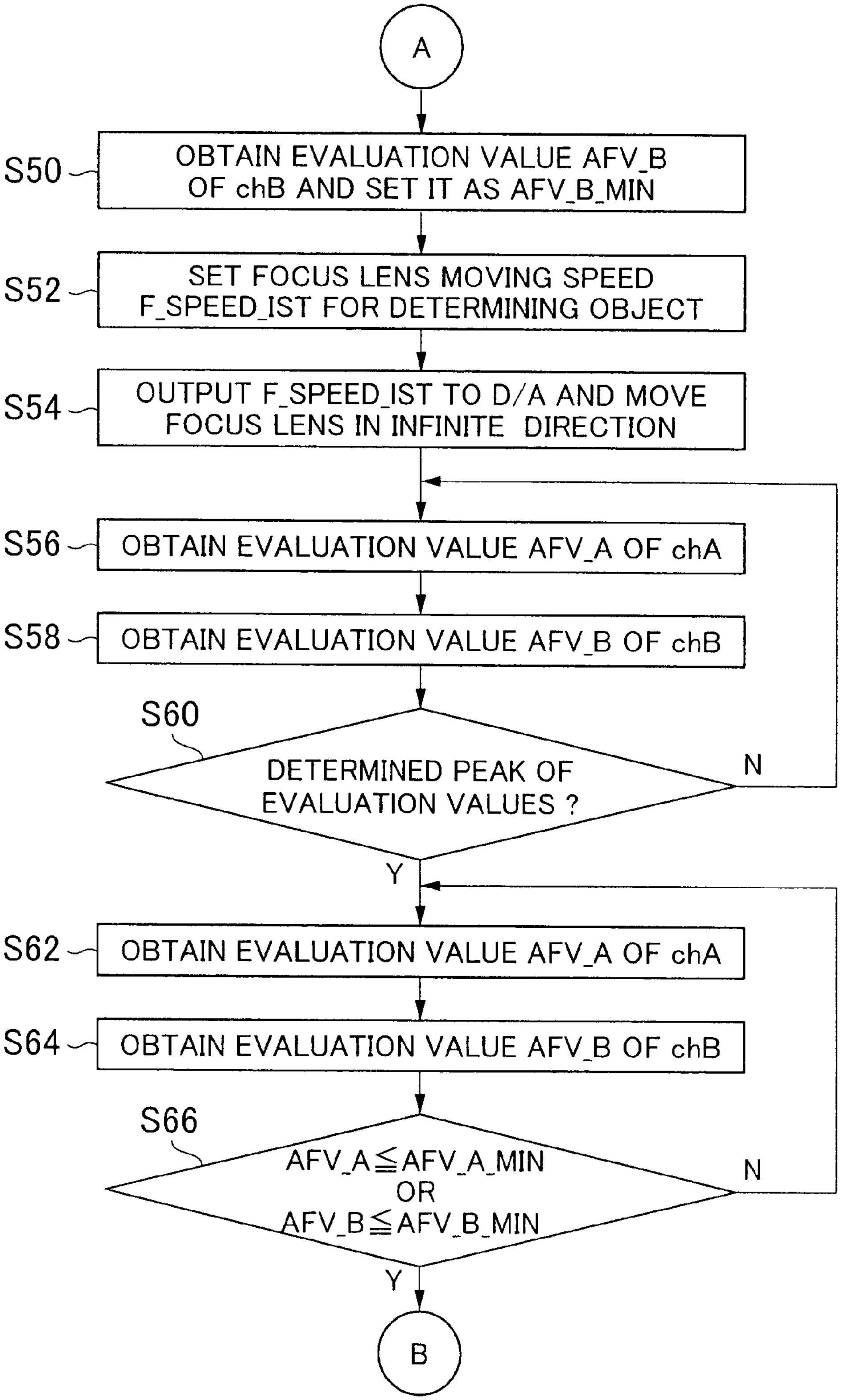
FIG. 7 is a flowchart showing the procedure of the focus evaluation value sensitivity correction process in the CPU.
Figure 8:
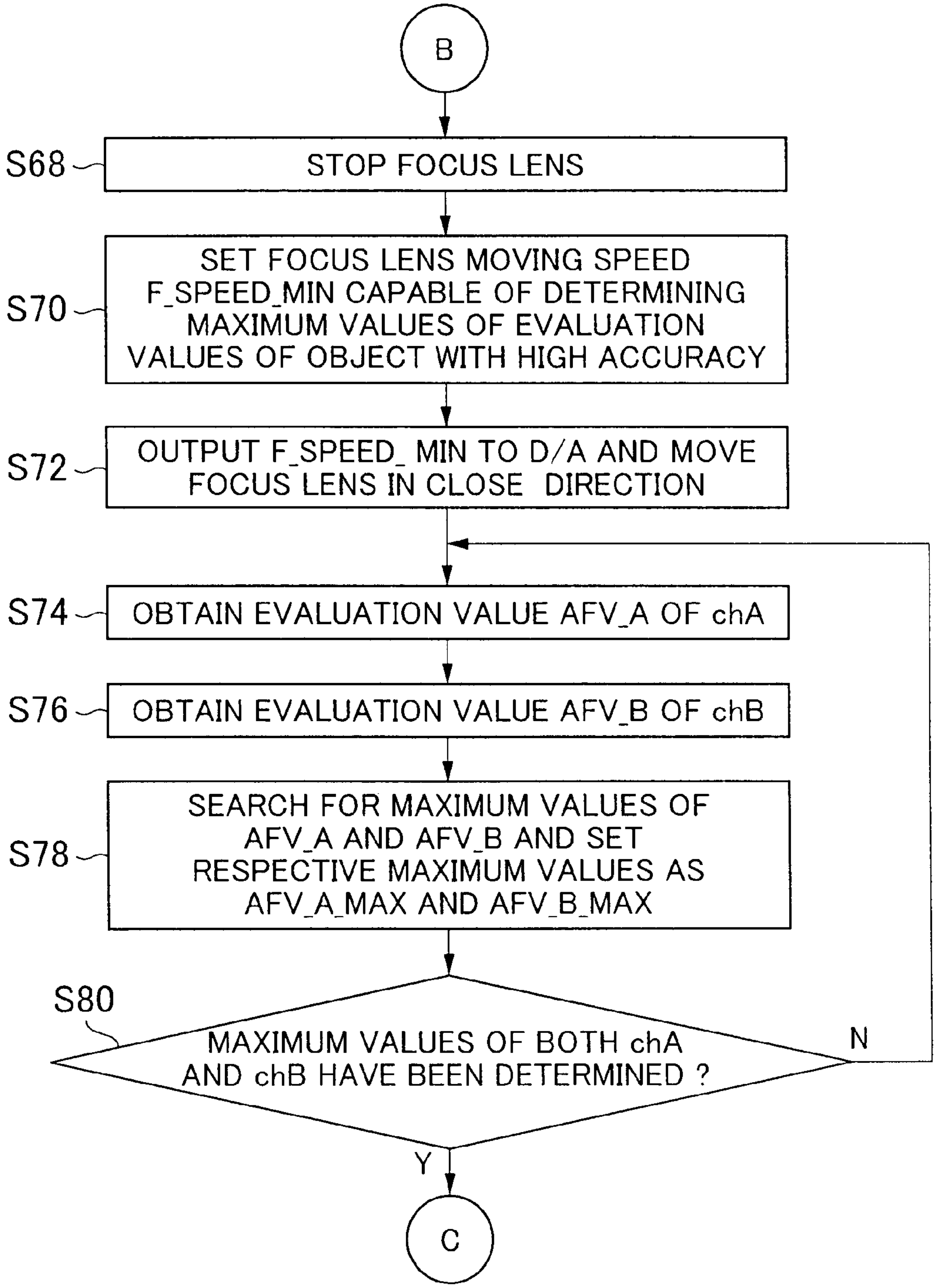
FIG. 8 is a flowchart showing the procedure of the focus evaluation value sensitivity correction process in the CPU.
Figure 9:
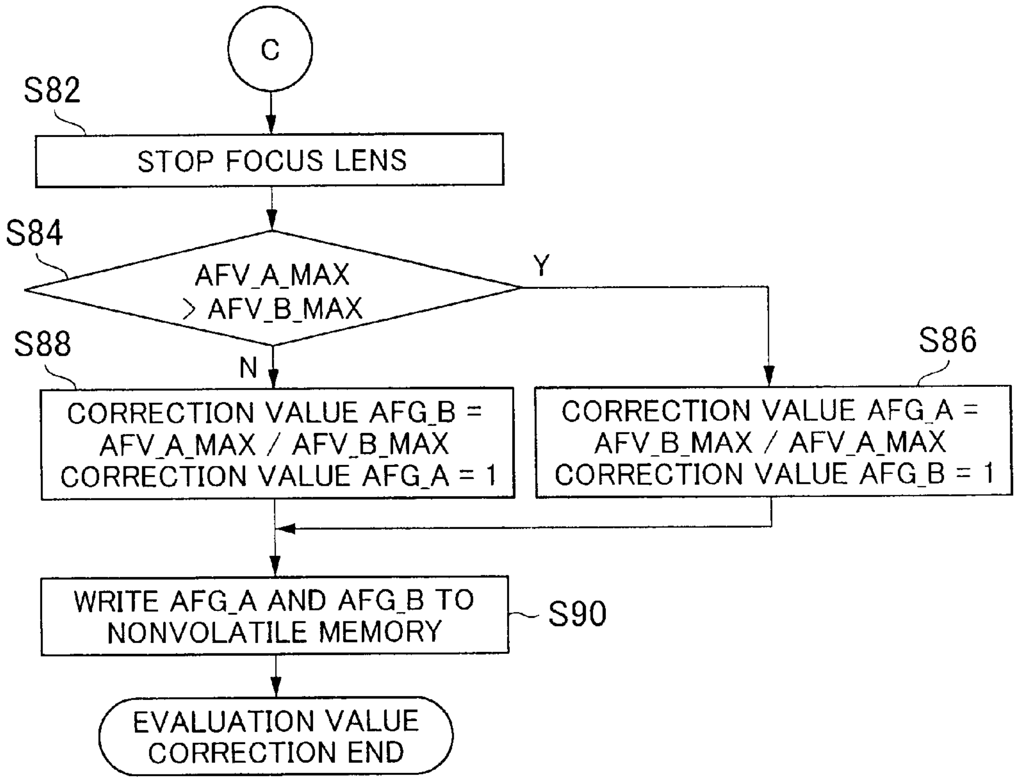
FIG. 9 is a flowchart showing the procedure of the focus evaluation value sensitivity correction process in the CPU.
Figure 10:
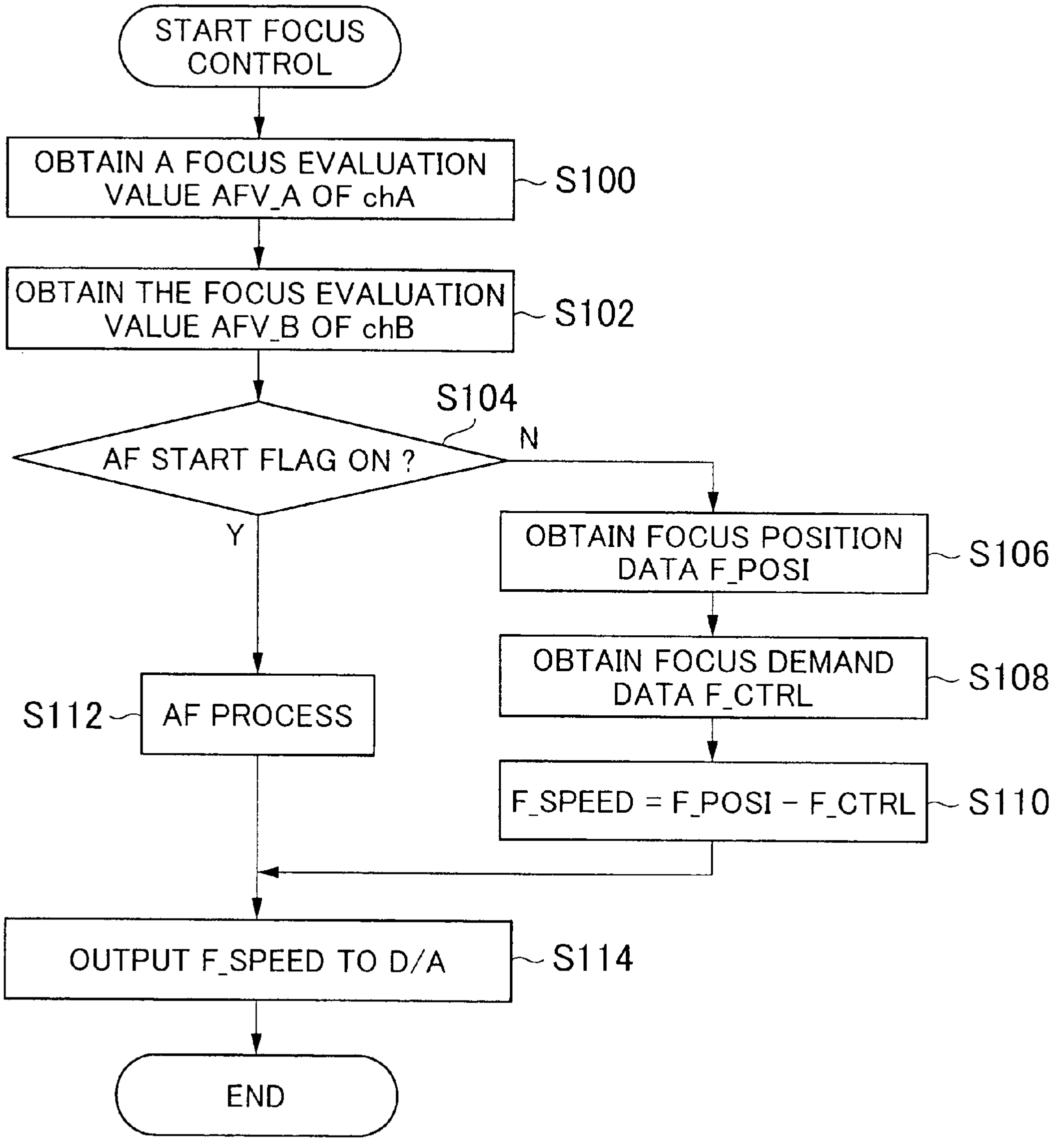
FIG. 10 is a flowchart showing a focus control procedure in FIG. 5.

FIG. 10 is a flowchart showing the focus control process in the step S26 in FIG. 5 described above. In case of performing the focus control process, the CPU 40 first obtains the focus evaluation value AFV_A of the focus state determining image pickup device 32A (chA) (step S100) and also obtains the focus evaluation value AFV_B of the focus state determining image pickup device 32B (chB) from the focus evaluation value generating part 70 (step S102).

Figure 11:
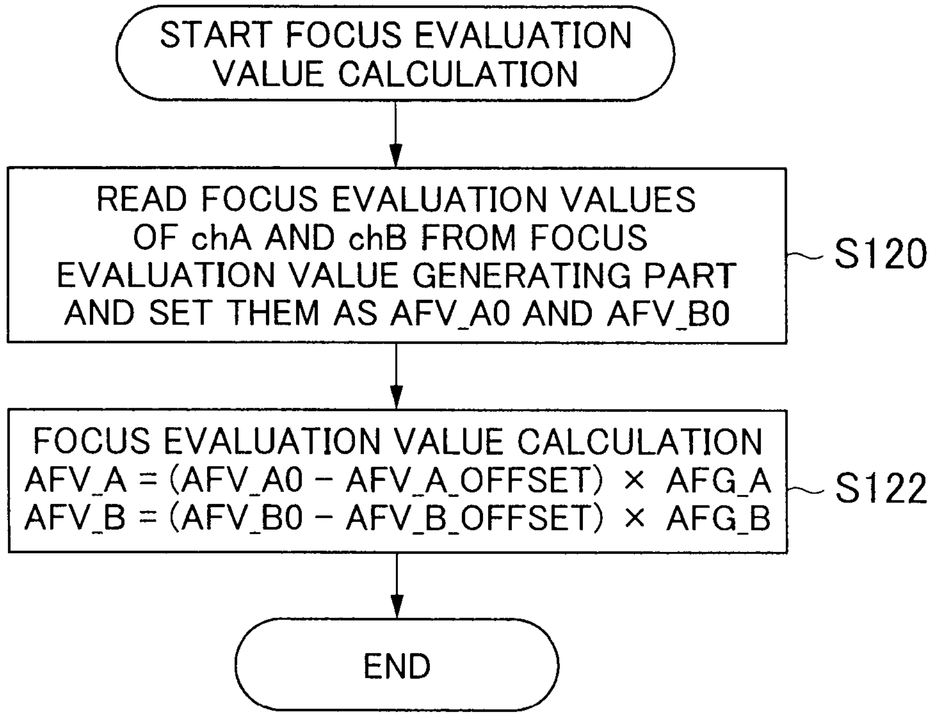
FIG. 11 is a flowchart showing the procedure of focus evaluation value calculation in the CPU.

Here, the focus evaluation values AFV_A and AFV_B obtained in the steps S100 and S102 indicate the corrected focus evaluation values, and the correction procedure thereof is shown in FIG. 11. First, the CPU 40 reads the focus evaluation values (focus evaluation values before the correction) of chA and chB from the focus evaluation value generating part 70, and sets them as AFV_A0 and AFV_B0, respectively (step S120). As shown in the above formulas (1) and (2), the corrected focus evaluation values AFV_A and AFV_B are calculated with the following formulas by using the correction data AFV_A_OFFSET, AFV_B_OFFSET, AFG_A and AFG_B read from the memory 72 in the step S16 in FIG. 5.

$$AFV\_A = (AFV\_A0 - AFV\_A\_\mathrm{OFFSET}) \times AFG\_A \quad (8)$$

$$AFV\_B = (AFV\_B0 - AFV\_\mathrm{B\_OFFSET}) \times AFG\_B \quad (9)$$

To describe it by returning to FIG. 10, after obtaining the focus evaluation values AFV_A and AFV_B of chA and chB calculated as above, the CPU 40 then determines whether or not an AF start flag is set at ON (step S104). If determined as NO, it performs an MF process.

In the case of the MF process, the CPU 40 obtains the focus position data F_POSI showing the current position of the focus lens 16 from the focus lens position detector 56 (step S106), and also obtains the focus demand data F_CTRL showing the moving target position of the focus lens 16 from the focus demand 62 (step S108). It acquires the difference F_POSI F_CTRL between the obtained focus position data F_POSI and the focus demand data F_CTRL, and sets that value as the moving speed F_SPEED for moving the focus lens 16 to the moving target position directed by the focus demand 62 (step S110). It outputs the moving speed F_SPEED as the control signal to the focus motor drive circuit 44 via the D/A converter 54 (step S114).

On the other hand, if determined as YES, that is, the AF start flag is ON in the step S104, the CPU 40 performs the AF process (step S112).

Figure 12:
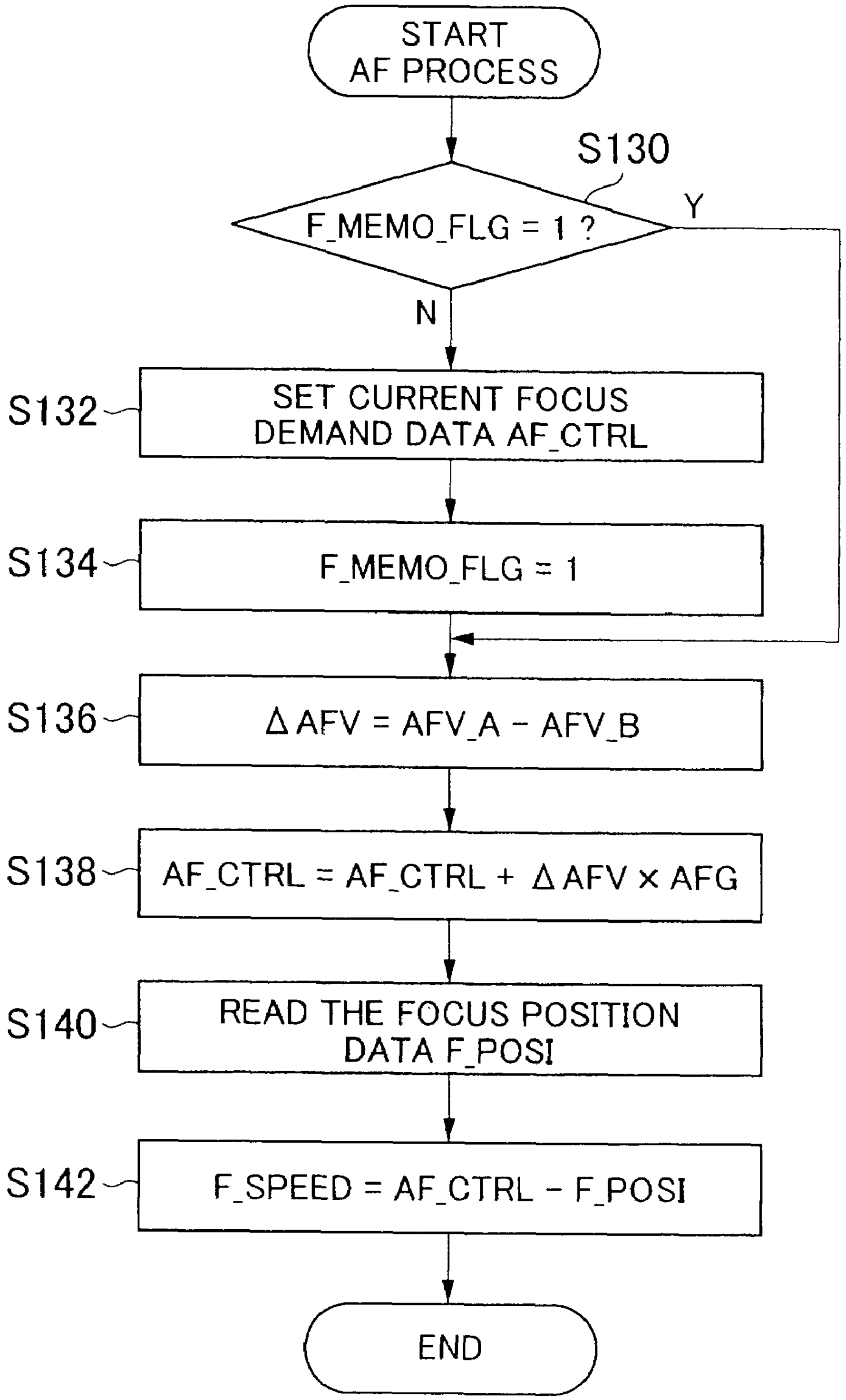
FIG. 12 is a flowchart showing a procedure of an AF process in FIG. 10.

FIG. 12 is a flowchart showing the AF procedure in the step S 12. First, the CPU 40 determines whether or not a parameter F_MEMO_FLG is set at 1 (step S 130). In the first process after shifting from the MF control to the AF control, it is determined as NO. In that case, the CPU 40 obtains the focus demand data indicating the current moving target position from the focus demand 62, and sets that data value as the initial (current) moving target position F_CTRL (step S132). Next, it sets the parameter F_MEMO_FLG at 1 (step S134). If determined as YES in the step S130, the process in the steps S132 and S134 is not performed.

Next, the CPU 40 acquires the difference ΔAFV=AFV_A—AFV_B between the focus evaluation value AFV_A of corrected chA and the focus evaluation value AFV_B of chB obtained in the steps S100 and S102 in FIG. 10 (step S136).

It adds to the current moving target position AF_CTRL the value (travel distance) ΔAFV×AFG which is the value of the ΔAFV multiplied by the predetermined AF gain AFG, and sets that value as a new moving target position AF_CTRL (step S138). To be more specific, it is AF_CTRL=AF_CTRL+ΔAFV×AFG.

Next, the CPU 40 reads the focus position data F_POSI showing the current position of the focus lens 16 from the focus lens position detector 56 (step S 140), and sets the difference AF_CTRL−F_POSI between the focus position data F_POSI and the moving target position AF_CTRL set in the step S138 as the moving speed F_SPEED for moving the focus lens 16 (step S142). It returns to the flowchart in FIG. 10, and outputs the moving speed F_SPEED as the control signal to the focus motor drive circuit 44 via the D/A converter 54 (step S114).

Through the above process, the focus lens 16 moves to the focusing position at the moving speed according to a focal distance and an F value of the picture-taking lens.

Figure 13:
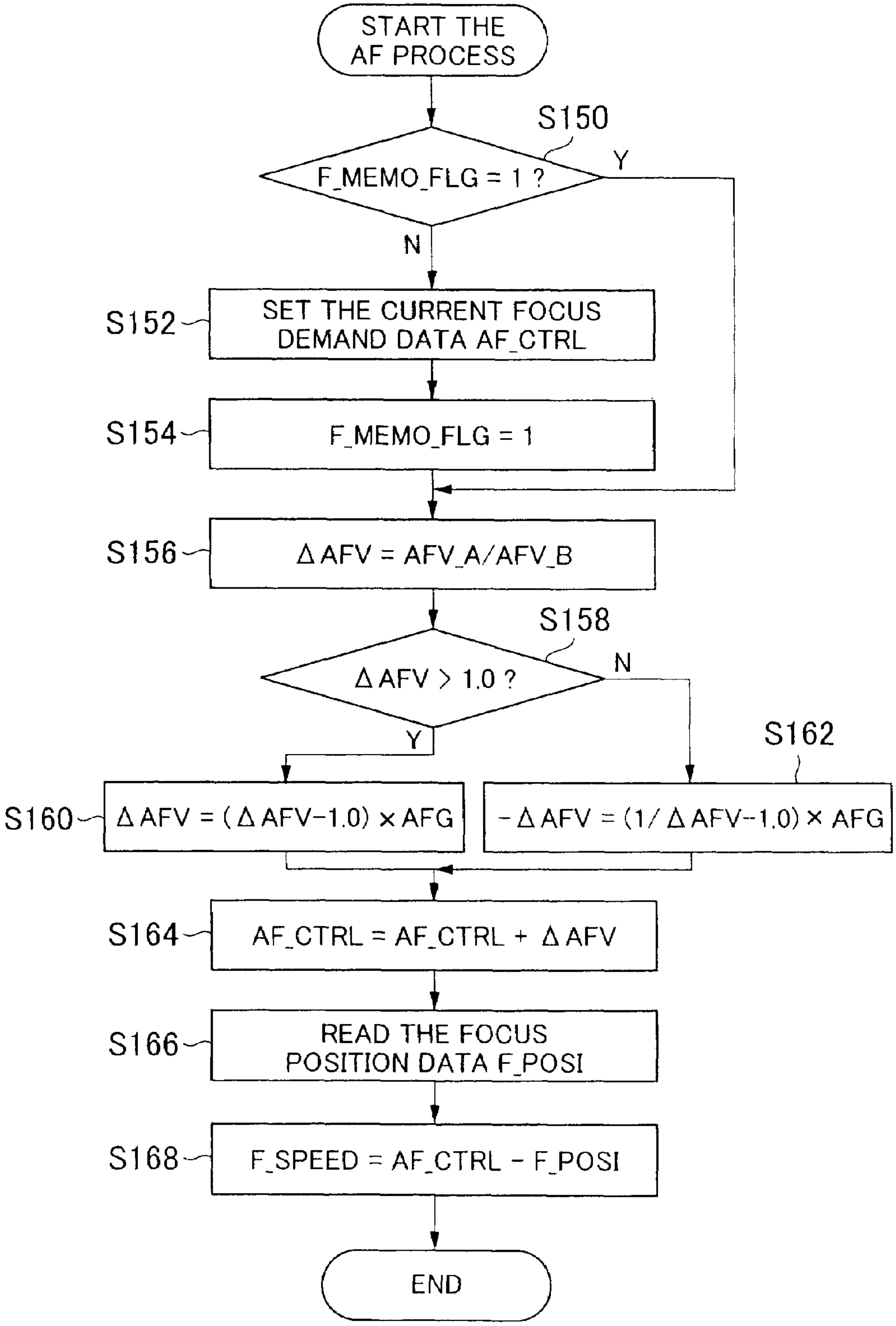
FIG. 13 is a flowchart showing the procedure of the AF process in another form.

Next, a description will be given by referring to the flowchart in FIG. 13 of the AF process in the case where the element for setting the travel distance is the ratio AΔAFV=AFV_A/AFV_B between the focus evaluation value AFV_A of the chA and the focus evaluation value AFV_B of chB as described above instead of the difference ΔAFV=AFV_A−AFV_B between the focus evaluation value AFV_A of chA and the focus evaluation value AFV_B of chB as the AF process shown in FIG. 12. The process in the steps S150 to S154 in the flowchart in FIG. 13 is just the same as the process in the steps S130 to S134 in FIG. 12, and so the description will start from the process in a step S156 in FIG. 13.

After performing the process in the steps S 150 to S 154, the CPU 40 then acquires the ratio ΔAFV=AFV_A/AFV_B between the focus evaluation value AFV_A of the corrected chA and the focus evaluation value AFV_B of chB obtained in the steps S100 and S102 in FIG. 10 (step S156).

The CPU 40 determines whether or not the ratio ΔAFV between the focus evaluation values is larger than 1.0 (step S158). If determined as YES, it is ΔAFV=(ΔAFV−1.0)×AFG (step S160). If determined as NO, it is—ΔAFV=(1/ΔAFV−1.0) XAFG (step S162). AFG indicates the value of the predetermined AF gain. The CPU 40 adds to the current moving target position AF_CTRL the acquired value (travel distance) ΔAFV, and sets that value as the new moving target position AF_CTRL (step S164). To be more specific, it is AF_CTRL=AF_CTRL+ΔAFV.

Next, the CPU 40 reads the focus position data F_POSI showing the current position of the focus lens 16 from the focus lens position detector 56 (step S166), and sets the difference AF_CTRL−F_POSI between the focus position data F_POSI and the moving target position AF_CTRL set in the step S164 as the moving speed F_SPEED for moving the focus lens 16 (step S168). It returns to the flowchart in FIG. 10, and outputs the moving speed F_SPEED as the control signal to the focus motor drive circuit 44 via the D/A converter 54 (step S114).

The description of the above embodiment was given as to the case where the AF control is exerted by obtaining two focus evaluation values from the two focus state determining image pickup devices 32A, 32B. However, it is not limited thereto but, even in the case where the AF control is exerted based on three or more focus evaluation values obtained from three or more image pickup devices placed at positions of different light path lengths, a process which matches up the sensitivity of the focus evaluation values can be performed in the same manner as in the above embodiment.

According to the above embodiment, as for the AF control, the moving target position of the focus lens 16 is set by the difference or ratio between the focus evaluation values of chA and chB, and the focus lens 16 is moved at the moving speed corresponding to the difference between the moving target position and current position. However, it is not limited thereto but it is also possible to directly set the moving speed by the difference or ratio between the focus evaluation values of chA and chB and move the focus lens 16 at that moving speed.

As for the above embodiment, the case of applying the present invention to a TV camera system was described as an example. However, it is not limited thereto but the present invention is also applicable to a video camera and a still camera for shooting a static image.

Figure 14:
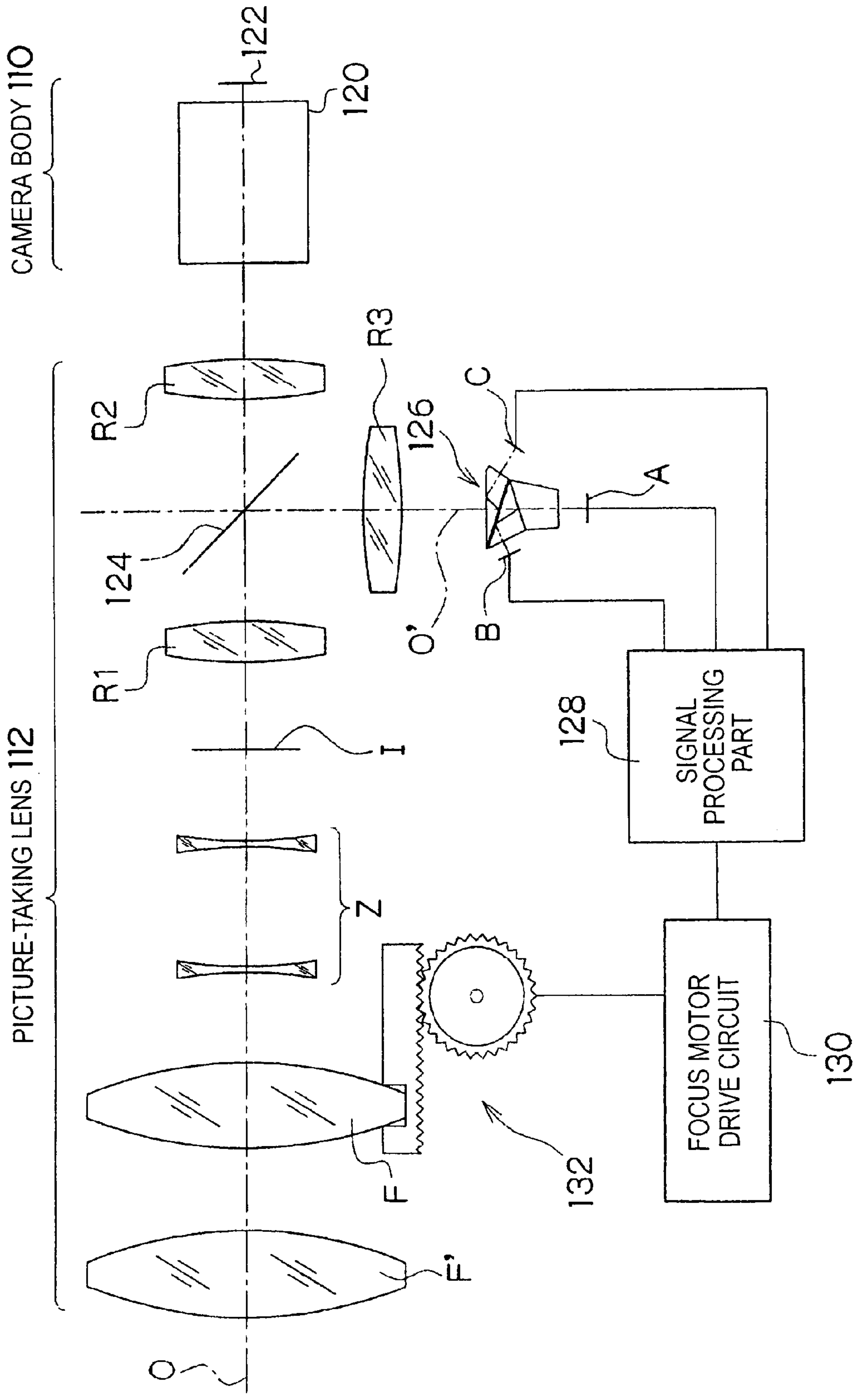
FIG. 14 is a block diagram showing a configuration of a TV camera system to which the present invention is applied.

Next, another embodiment will be described. FIG. 14 is a block diagram showing a configuration of the TV camera system to which the present invention is applied. The TV camera system shown in this drawing is comprised of a camera body 110, a replaceable picture-taking lens 112 and so on, and the camera body 110 contains the image pickup device (video image pickup device) for shooting the images for recording and reproduction and outputting or recording on a record medium the picture signal in a predetermined format, necessary circuits and so on. On the other hand, the picture-taking lens 112 is detachably mounted on the front side of the camera body 110. As shown in the drawing and as generally known, the optical system of the picture-taking lens 112 has a fixed focus lens F', a movable focus lens F, a zoom lens Z comprised of a variable power system and a compensation system, an iris I, and a relay lens (relay optical system) comprised of a front side relay lens R1 and a back side relay lens R2 placed from the front end side. The configuration of each lens in the drawing is simplified, showing a lens group comprised of a plurality of lenses as one lens.

As shown in the drawing, on a light path of the object light between the front side relay lens R1 and the back side relay lens R2 of the relay optical system, a semitransparent mirror 124 for branching object light for determining a focus state from the object light for the images is placed to be inclined approximately 45 degrees toward an optical axis O of the picture-taking lens 112.

Of the object light incident from the front end side of the picture-taking lens 112, the light other than that branched by the semitransparent mirror 124, that is, the object light for the images which filtered out of the semitransparent mirror 124 is emitted from a back end side of the picture-taking lens, and then gets incident on an image pickup part 120 of the camera body 110. The configuration of the image pickup part 120 will be omitted. The object light which got incident on the image pickup part 120 is decomposed into three colors of red light, green light and blue light by a color separation optical system for instance, and gets incident on an image pickup surface of the image pickup device (video image pickup device) of each color. Thus, a color image for broadcasting is shot. A focus surface 122 in the drawing is an optically equivalent position to the image pickup surface of each video image pickup device shown on the optical axis O of the picture-taking lens 112.

On the other hand, the object light reflected on the semitransparent mirror 124 is led to an image pickup part 126 for determining the focus state along an optical axis O' which is approximately vertical to the optical axis O as the object light for determining the focus state. Here, the object light is in a state of approximately parallel light between the front side relay lens R1 and the back side relay lens R2, and the object light reflected on the semitransparent mirror 124 passes through the relay lens R3 for collecting light having the same nature as the back side relay lens R2 and then gets incident on the image pickup part 126 for determining the focus state.

Figure 15:
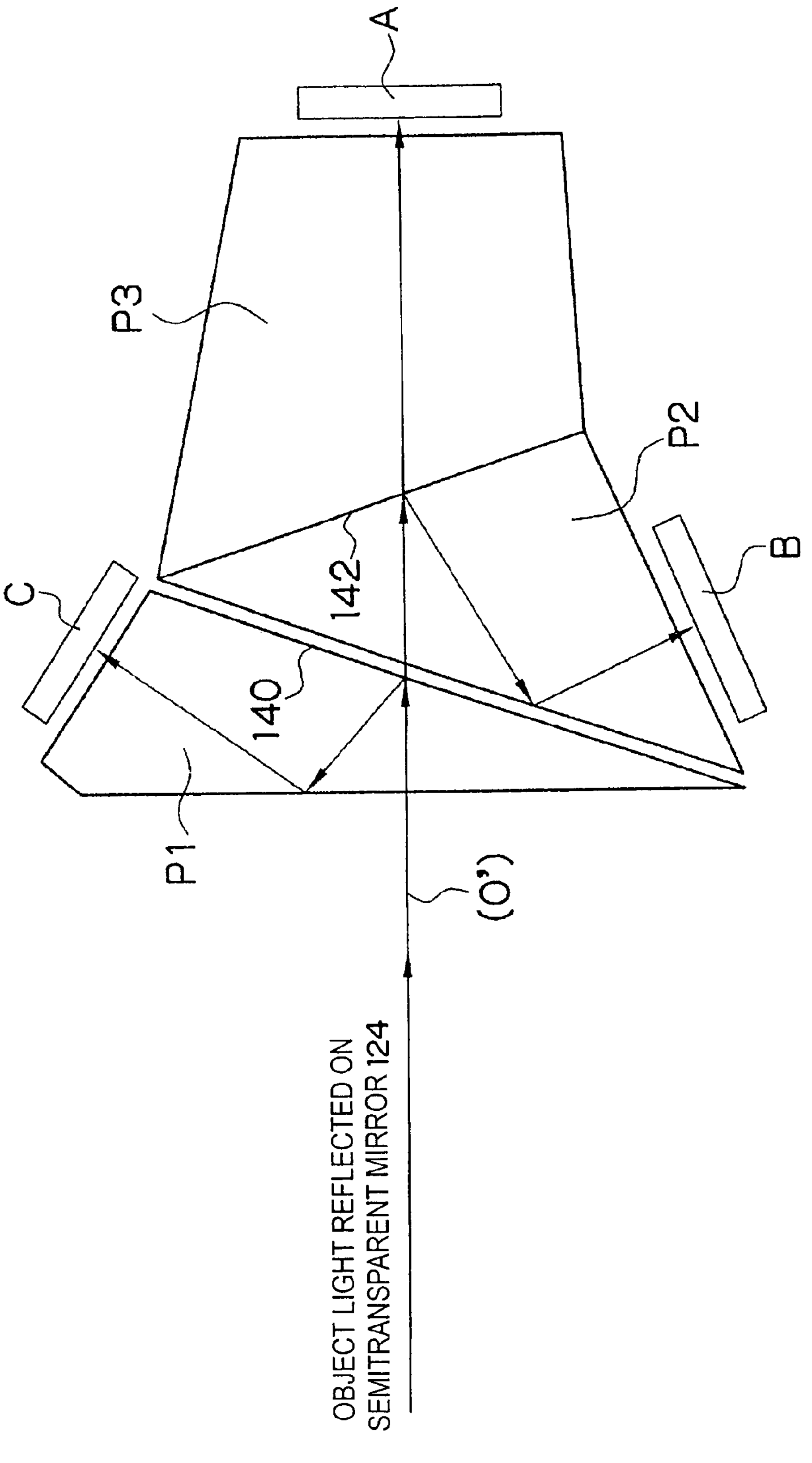
FIG. 15 is a block diagram showing a configuration of an image pickup part for determining a focus state.

FIG. 15 is a block diagram showing the configuration of the image pickup part 126 for determining the focus state.

As shown in FIG. 15, the image pickup part 126 is comprised of three prisms P1, P2 and P3 constituting a light division optical system and three image pickup devices for determining the focus state (two-dimensional CCDs) A, B and C. In case of referring to the image pickup devices A, B and C especially distinguishing them from the video image pickup devices mounted on the camera body 110, they are referred to as focus state determining image pickup devices A, B and C.

As described above, the object light reflected on the semitransparent mirror 124 and having proceeded along the optical axis O' gets incident on the first prism P1 first, and is divided into reflected light and transmitted light on a semitransparent mirror surface 140 of the first prism P1. The reflected light thereof gets incident on the image pickup surface of the image pickup device C. The transmitted light gets incident on the second prism P2, and is further divided into the reflected light and transmitted light on a semitransparent mirror surface 142 of the second prism P2. The reflected light thereof gets incident on the image pickup device B. The transmitted light passes through the third prism P3 and gets incident on the image pickup device A. The object light is divided on the semitransparent mirror surface 140 of the first prism P1 and semitransparent mirror surface 142 of the second prism P2 so that the light volume of the object light incident on each of the image pickup devices A, B and C becomes equal. The image pickup devices A, B and C do not need to pick up a color image but they are the CCDs for picking up a black and white image according to this embodiment.

Figure 16:
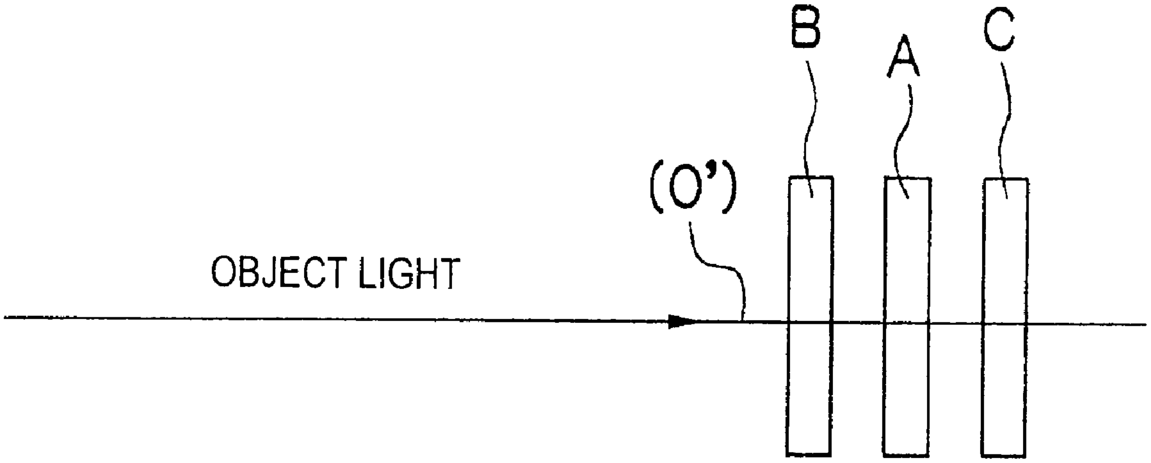
FIG. 16 is a diagram showing focus state determining image pickup devices on the same optical axis.

If the optical axes of the object light incident on the video image pickup devices A, B and C are presented on the same straight line, as shown in FIG. 16, the light path length of the image pickup device B is the shortest, the light path length of the image pickup device C is the longest, and the light path length of the image pickup device A has an intermediate length between the image pickup device B and C against the object light before getting incident on the image pickup device A, B and C. To be more specific, the image pickup surfaces of the image pickup devices B and C are placed in parallel at the positions of an equal distance frontward and backward from the image pickup surface of the image pickup device A. The image pickup surface of the image pickup device A is in a coupling relationship with the focus surface 122 (refer to FIG. 14) of the camera body 110, and the light path length to the object light incident on the picture-taking lens 112 matches with the image pickup surface of the video image pickup device of the camera body 110. The image pickup device A is placed so that there is a match between an object surface of which imaging surface is the image pickup surface of the video image pickup device and the object surface of which imaging surface is the image pickup surface of the video image pickup device A. It is not necessarily limited to the case where the light path length matches with the image pickup surface of the video image pickup device. The light division optical system for dividing the object light into the image pickup devices A, B and C is not limited to the configuration using the above-mentioned prisms P1 to P3.

According to the optical system constituted as above, of the object light incident on the picture-taking lens 112, the object light branched by the semitransparent mirror 124 has the image thereof picked up by the image pickup devices A, B and C of different light path lengths placed close to the position coupled to the focus surface 122 of the camera body 110.

Next, a description will be given as to an overview of the auto focus control based on focus state determination. As shown in FIG. 14, the image (picture signals) picked up by the focus state determining image pickup devices A, B and C is taken into a signal processing part 128. As will be described later, the signal processing part 128 seeks a position of a focus lens F (focus position) at which the focus state of the picture-taking lens 112 becomes focusing on the focus surface 122 of the camera body 110 based on high frequency components of the picture signals picked up by the image pickup devices A, B and C. It outputs to a focus motor drive circuit 130 the control signal for providing an instruction to move the focus lens F to that focus position. The focus motor drive circuit 130 drives a focus motor (not shown) and moves the focus lens F via a power transmission mechanism 132 comprised of a gear and so on so as to set the focus lens F at the focus position directed by the signal processing part 128. The auto focus control is exerted by successively performing such a process.

Figure 17:
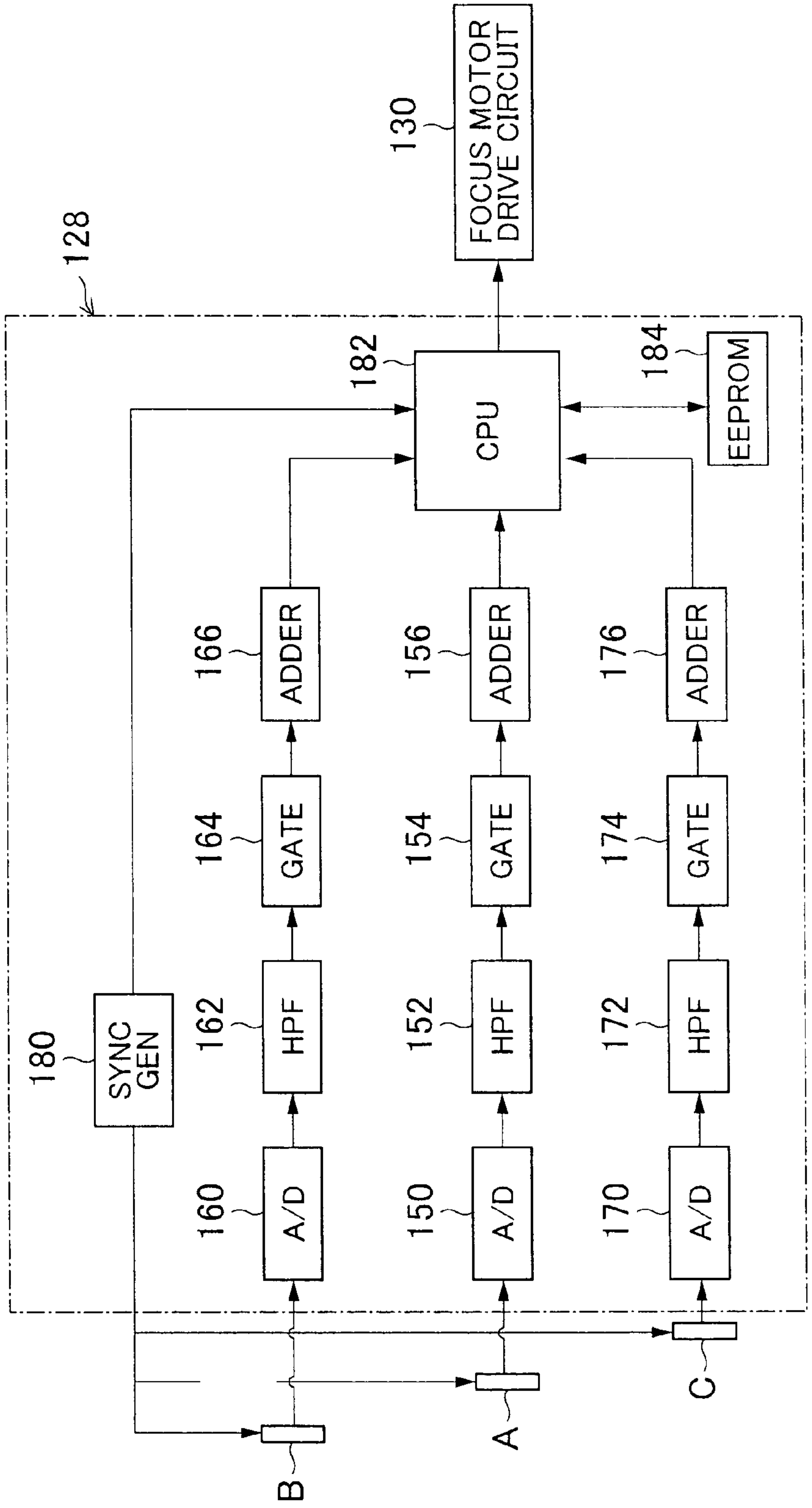
FIG. 17 is a block diagram showing a configuration of a signal processing part for determining the focus state.

Subsequently, the configuration of the signal processing part 128 and the process of the focus state determination will be described. FIG. 17 is a block diagram showing the configuration of the signal processing part 128. The configuration of the signal processing part 128 shown in FIG. 17 shows a basic configuration for describing the contents of the process in the signal processing part 128. The configuration in FIG. 17 is referred to as the configuration in the past for convenience sake, and the configuration related to the present invention will be described later. As shown in FIG. 17, the image of the object picked up by the focus state determining image pickup devices A, B and C is outputted as the picture signals in the predetermined format which are then converted into the signals of the focus evaluation values indicating the degree of sharpness of the image (contrast of the image) through A/D converters 150, 160 and 170, high-pass filters (HPF) 152, 162 and 172, gating circuits 154, 164 and 174, and adders 156, 166 and 176 placed on the image pickup devices A, B and C, respectively, so as to be inputted to a CPU 182.

Figure 18:
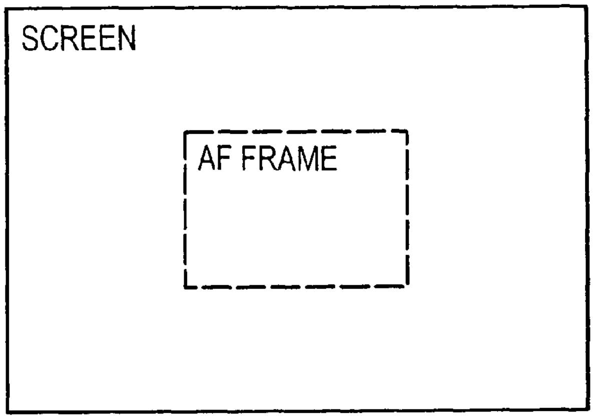
FIG. 18 is a diagram showing an example of an AF frame against a screen.

To describe the process until acquiring the focus evaluation value by referring to the circuit placed to the image pickup device A, the picture signal outputted from the image pickup device A is a luminance signal, for instance, indicating the luminance of each pixel to which a horizontal sync signal of approximately 1/15.75 kHz and a vertical sync signal of approximately 1/60 kHz given from a synchronization signal generation circuit 180 are added. The picture signals are converted into digital signals by the A/D converter 150, and are inputted to the high-pass filter (HPF) 152 thereafter to have the high frequency components of the picture signals extracted. The signals of the high frequency components extracted by the HPF 152 are inputted to the gating circuit 154 next so that, of the picture signals equivalent to one screen (equivalent to one field), only the signals corresponding to the pixels in a predetermined AF frame (a screen central part, for instance) subject to the auto focus control are extracted by the gating circuit 154. The AF frame is set in the central part of the screen (the angle of view of the picture-taking lens 112) as shown in FIG. 18, for instance. The values of the signals in the AF frame equivalent to one screen extracted by the gating circuit 154 are added by the adder 156.

Thereby, the sum total of the values of the high frequency components of the picture signals in the AF frame is acquired, and the value obtained by the adder 156 is read by the CPU 182 as the focus evaluation value showing whether the degree of sharpness of the image in the AF frame is high or low.

Various synchronization signals are given to the circuits of the image pickup devices A, B and C, CPU 182 and so on from the synchronization signal generation circuit 180 so as to synchronize the processing in the circuits. In the description hereafter, the focus evaluation values obtained from the image pickup devices A, B and C are referred to as the focus evaluation values of channels (ch) A, B and C. The signal processing part 128 has an EEPROM 184 and so on capable of reading and writing the data with the CPU 182 placed thereon.

Figure 19:
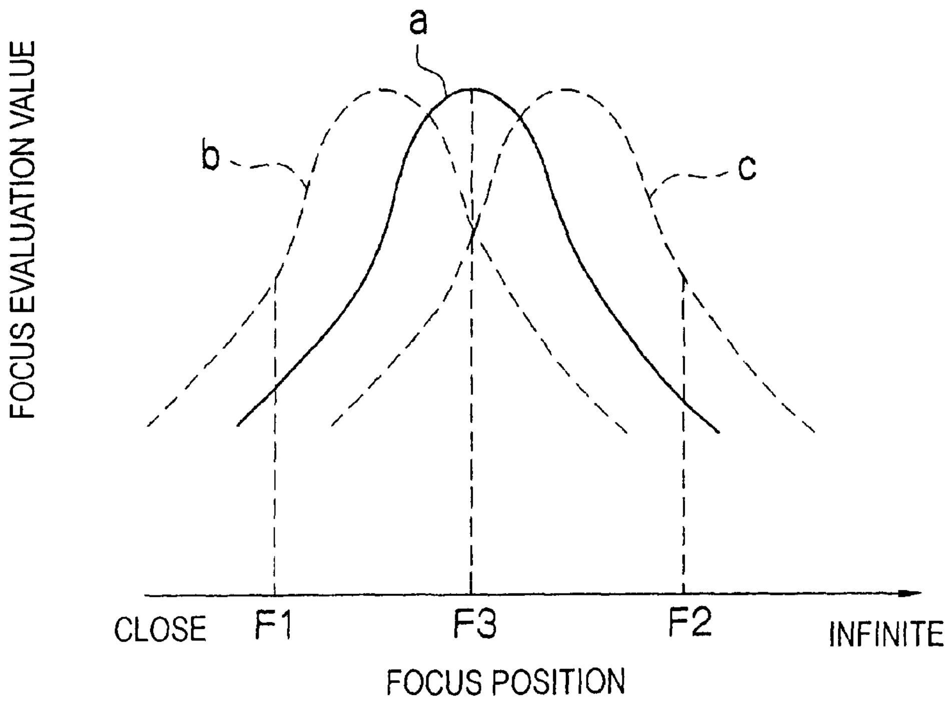
FIG. 19 is a diagram showing an appearance of the focus evaluation values of each focus state determining image pickup device against the focus positions at the time of shooting a certain object.

After reading the focus evaluation values of chA, B and C as described above, the CPU 182 determines a current focus state of the picture-taking lens 112 on the focus surface 122 of the camera body 110 based on the focus evaluation values thereof. FIG. 19 is a diagram showing an appearance of the focus evaluation values against the focus positions at the time of shooting a certain object by taking the focus positions of the picture-taking lens 112 as a horizontal axis and the focus evaluation values as a vertical axis. A curve a shown in a full line in the drawing shows the focus evaluation values of chA obtained from the focus state determining image pickup device A at the position coupled to the focus surface 122 of the camera body 110 against the focus positions. Curves b and c shown by dotted lines in the drawing show the focus evaluation values of the chB and chC obtained from the focus state determining image pickup devices B and C, respectively, against the focus positions.

In FIG. 19, a focus position F3 at which the focus evaluation value of chA shown by the curve a becomes maximum (local maximum) is the focusing position.

Now, it is assumed that the focus position of the picture-taking lens 112 is set at the position of F1 in FIG. 19. In this case, the respective focus evaluation values of chA, chB and chC are the values corresponding to the focus position F1 according to the curves a, b and c. In this case, at least the focus evaluation value of chB is larger than the focus evaluation value of chC, which shows that the focus position is set further on the close side than the focus position F3 being the focusing position, that is, a state of the front focus.

On the other hand, in the case where the focus position of the picture-taking lens 112 is set at the position of F2 in FIG. 19, the respective focus evaluation values of chA, chB and chC are the values corresponding to the focus position F2 according to the curves a, b and c. In this case, at least the focus evaluation value of chC is larger than the focus evaluation value of chB, which shows that the focus position is set further on the infinite side than the focus position F3 being the focusing position, that is, a state of the rear focus.

In the case where the focus position of the picture-taking lens 112 is set at the focusing position at F3 in FIG. 19, the respective focus evaluation values of chA, chB and chC are the values corresponding to the focus position F3 according to the curves a, b and c. In this case, the focus evaluation value of chB is equal to the focus evaluation value of chC, which shows that the focus position is set at the focusing position F3, that is, a focusing state.

Thus, it is possible, based on the focus evaluation values of the chA, chB and chC obtained from the image pickup devices A, B and C, respectively, to determine whether the focus state at the current focus position is the front focus, rear focus or focusing. According to this embodiment, the focus position to be focusing is determined as follows based on the focus evaluation values of chA, chB and chC obtained from the three image pickup devices A, B and C.

Figure 20:
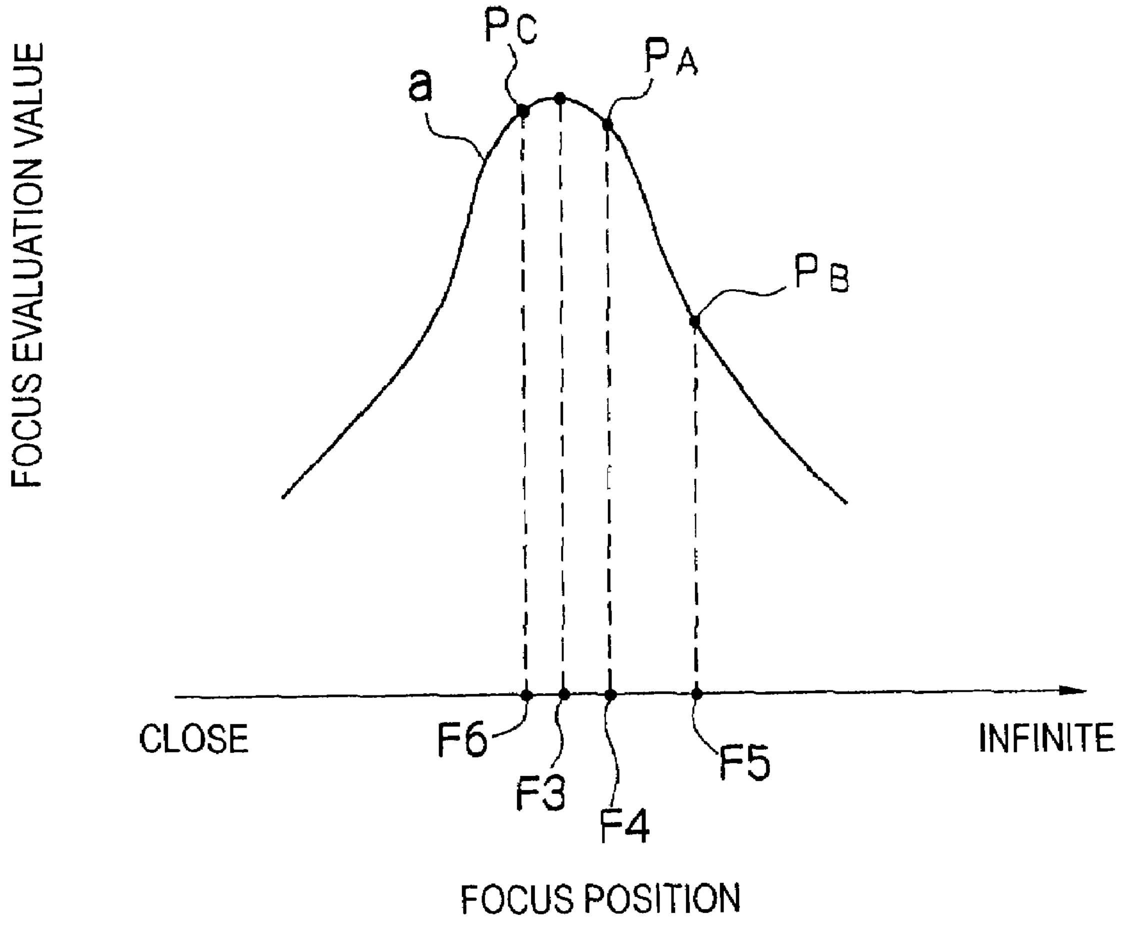
FIG. 20 is an explanatory diagram used for description of a focus state determination process by three focus state determining image pickup devices.

In FIG. 19 described above, the curves a, b and c indicating distribution of the respective focus evaluation values of chA, chB and chC may be approximately in the same shape. Therefore, the focus evaluation value of chB and chC at a certain focus position indicates the focus evaluation value of chA at the focus position displaced from that focus position by a predetermined shift amount. For instance, it is assumed that, on the curve a of the focus evaluation values of the chA shown in FIG. 20, the focus position is set at the position of F4 therein. In this case, the focus evaluation value of chA indicates the value of a point PA on the curve a. The focus evaluation value of chB indicates the value of a point PB on the curve a at the focus position F5 displaced further to the infinite side than the focus position F4 by the predetermined shift amount. The focus evaluation value of chC indicates the value of a point Pc on the curve a at the focus position F6 displaced further to the close side than the focus position F4 by the predetermined shift amount. The difference between the focus position F4 and the focus position F5, that is, the shift amount as to the focus evaluation value of chB is equal to the difference between the focus position of the maximum point on the curve b and the focus position of the maximum point on the curve a in FIG. 18, for instance. The difference between the focus position F4 and the focus position F6, that is, the shift amount as to the focus evaluation value of chC is equal to the difference between the focus position of the maximum point on the curve c and the focus position of the maximum point on the curve a in FIG. 19, for instance.

On the other hand, the curve a can be approximated by a predetermined function (curve of the second order, for instance). Therefore, it is possible to concretely identify the curve a from the focus evaluation values at the respective three points PA, PB and Pc of chA, chB and chC so as to acquire the focusing position F3 at which the focus evaluation value becomes maximum on the curve a.

After acquiring the focus position to be focusing based on the focus evaluation values of chA, chB and chC as described above, the CPU 182 in FIG. 17 sends the control signal to the focus motor drive circuit 130 to be the focus position, and moves the focus lens F thereto.

Figure 21:
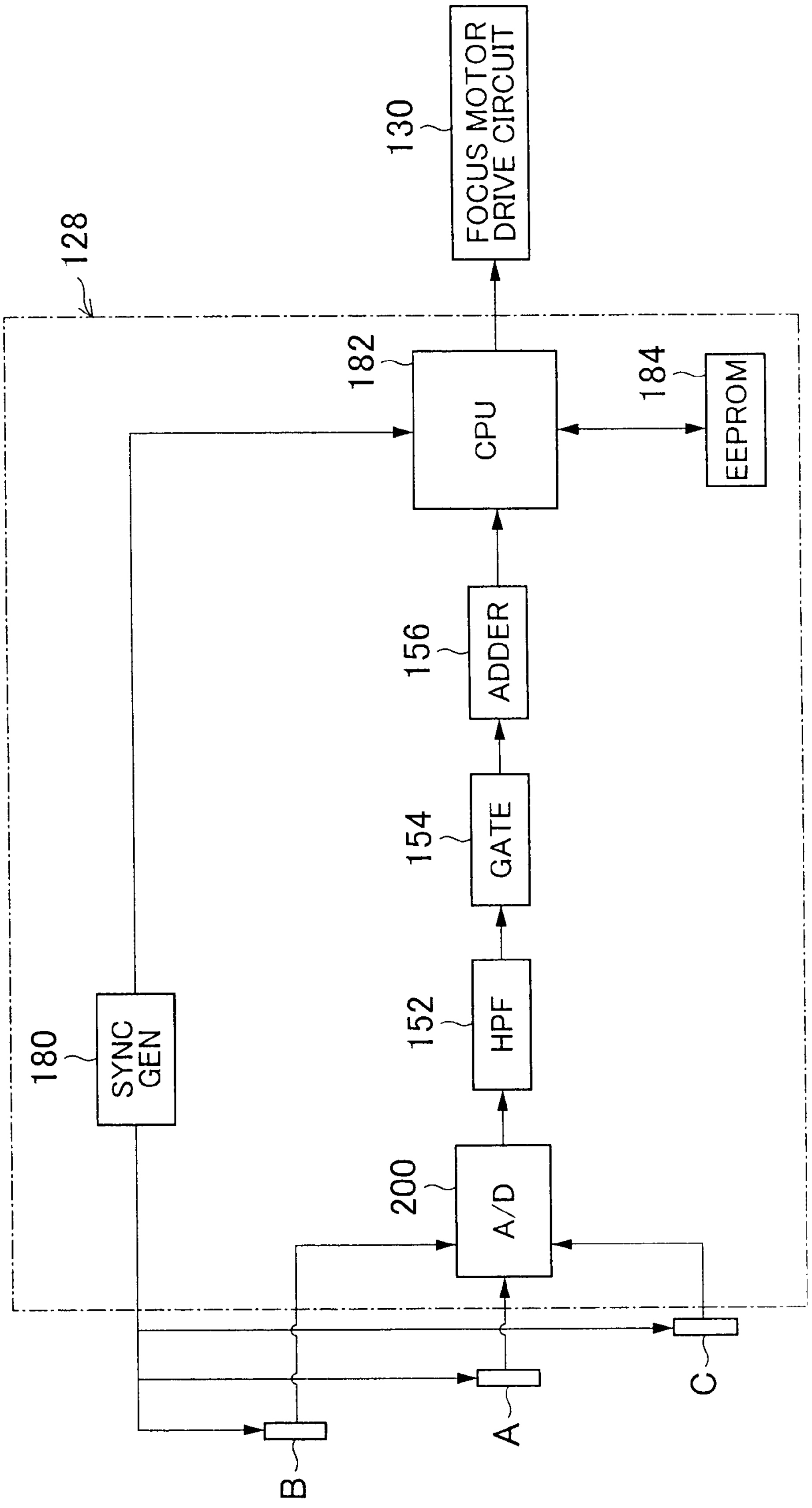
FIG. 21 is a block diagram showing a first embodiment of the configuration of the signal processing part to which the present invention is applied.

Next, a description will be given as to the configuration of the signal processing part 128 to which the present invention is applied as opposed to the configuration thereof in the past shown in FIG. 17. FIG. 21 is a block diagram showing the configuration of a first embodiment of the signal processing part 128 to which the present invention is applied. In FIG. 21, blocks given the same reference numerals as those in the past configuration in FIG. 17 are the blocks for performing the same or similar process as in FIG. 17. The first embodiment in FIG. 21 will be described in comparison with the configuration in the past in FIG. 17. While the picture signals from the focus state determining image pickup devices A, B and C (hereafter, referred to as the picture signals of chA, chB and chC) are processed in parallel on individual circuits to acquire the focus evaluation values of chA, chB and chC in the configuration in the past, a common processing part (circuit) processes the picture signals of chA, chB and chC by time-sharing according to the first embodiment in FIG. 21.

To be more specific, the picture signals of chA, chB and chC are inputted to an A/D converter 200 having three channels. The A/D converter 200 switches the channels for each field with the vertical sync signal to A/D-convert the picture signals of chA, chB and chC, and outputs the picture signals of chA, chB and chC converted into the digital signals to an HPF 152 for each field in order. According to this embodiment, it is assumed that the vertical sync signals in the picture signals of chA, chB and chC match up in timing.

For instance, the A/D converter 200 converts the picture signals of chA from the analog signals to digital signals and outputs them to the HPF 152 in a period from a certain vertical sync signal (first vertical sync signal) to the next vertical sync signal (second vertical sync signal). Next, it converts the picture signals of chB from the analog signals to digital signals and outputs them to the HPF 152 in the period from the second vertical sync signal to the next vertical sync signal (third vertical sync signal). Subsequently, it converts the picture signals of chC from the analog signals to digital signals and outputs them to the HPF 152 in the period from the third vertical sync signal to the next vertical sync signal (fourth vertical sync signal). Thus, the switching of the channels from the first vertical sync signal to the fourth vertical sync signal is repeated so as to output the picture signals of chA, chB and chC converted into digital signals for each field to the HPF 152. The A/D converter 200 may obtain the vertical sync signal either directly from the synchronization signal generation circuit 180 or from the picture signals inputted from the image pickup devices A, B and C.

Thus, the picture signals of chA, chB and chC outputted to the HPF 152 from the A/D converter 200 have the high frequency components thereof extracted by the HPF 152 as described as to the configuration in the past in FIG. 17. Only the signals in the AF frame (refer to FIG. 18) are extracted and outputted by the gating circuit 154. The signals equivalent to one field outputted from the gating circuit 154 are added by the adder 156. Thus, the CPU 182 is given the focus evaluation values of chA, chB and chC which are switched for each field in order of the channels processed by the A/D converter 200.

Thus, it is possible, by having the picture signals of the channels processed by the time-sharing by the common processing part, to reduce a circuit scale and power consumption of the signal processing part 128. In particular, the effect of sharing the HPF 152 having a large circuit scale among the channels for the sake of processing is significant.

Figure 22:
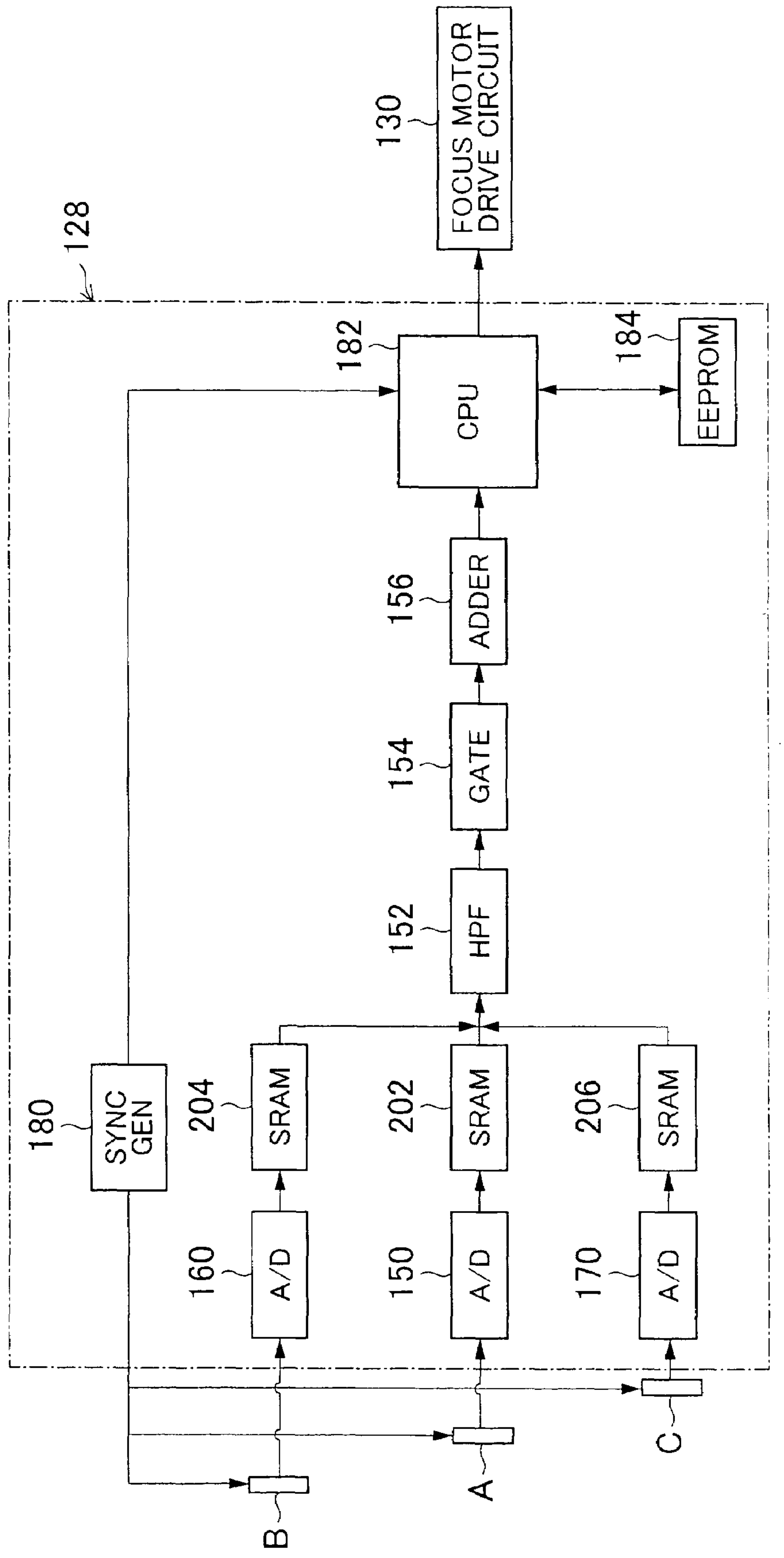
FIG. 22 is a block diagram showing a second embodiment of the configuration of the signal processing part to which the present invention is applied.

FIG. 22 is a block diagram showing a second embodiment of the configuration of the signal processing part 128 to which the present invention is applied. The blocks to which the same reference numerals as those in the past configuration in FIG. 17 and the first embodiment in FIG. 21 are given are the blocks for performing the same or similar process as in FIGS. 17 and 21. The process from the HPF 152 onward according to the second embodiment in FIG. 22 matches with the process from the HPF 152 onward according to the first embodiment in FIG. 21. On the other hand, according to the second embodiment in FIG. 22, the picture signals of chA, chB and chC outputted from the image pickup devices A, B and C are converted into the digital signals by the A/D converters 150, 160 and 170 individually provided as in the past configuration in FIG. 17. Thereafter, the picture signals equivalent to one field, for instance, outputted from the image pickup devices A, B and C at the same time are stored in SRAMs (Static Random Access Memory) 202, 204 and 206, respectively. The picture signals equivalent to one field stored in the SRAMs 202, 204 and 206 are outputted to the HPF 152 in the predetermined order, respectively.

For instance, the picture signals equivalent to one field of chA stored in the SRAM 202 are outputted to the HPF 152 first, and the picture signals equivalent to one field of chB stored in the SRAM 204 are subsequently outputted to the HPF 152. Next, the picture signals equivalent to one field of chC stored in the SRAM 206 are outputted to the HPF 152. Thus, it is possible, by storing in the memory the signals outputted from the image pickup devices A, B and C at the same time, to obtain any focus evaluation values of chA, chB and chC based on the picture signals obtained by having their images picked up on the image pickup devices A, B and C at the same time. To be more specific, in the first embodiment in FIG. 21, the picture signals in real time outputted from the image pickup devices A, B and C are processed by the time-sharing, and so it is not possible to obtain the focus evaluation values of the image picked up on the image pickup devices A, B and C at the same time. In the second embodiment in FIG. 22, however, it is possible to obtain the focus evaluation values of the image picked up on the image pickup devices A, B and C at the same time.

The channels are switched for each field so as to process the picture signals in one processing part in the first embodiment in FIG. 21 and the second embodiment in FIG. 22. However, it is feasible to switch the channels each time it finishes processing the picture signals at least necessary at the time of seeking the focus evaluation values, that is, the picture signals in the AF frame (refer to FIG. 18). The processing contents processed by the time-sharing in one processing part may be different from those in the first and second embodiments, and the present invention is applicable in the case where all or a part of the process performed to the picture signals is processed by the time-sharing in one processing part. In particular, it is also effective to perform only the process of the HPF 152 by the time-sharing in one processing part and perform the process other than that in an individual processing part of each channel.

Figure 23:
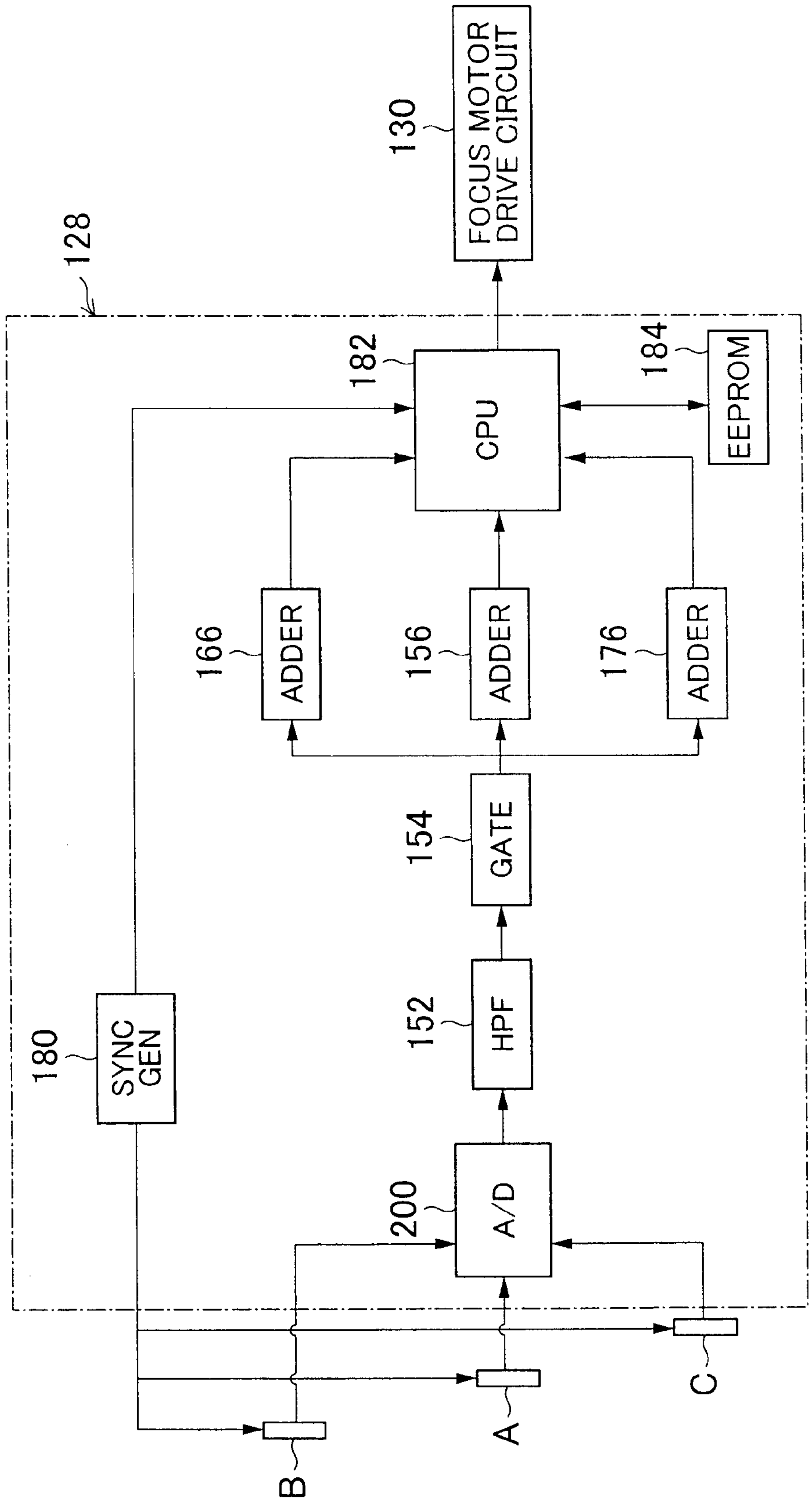
FIG. 23 is a block diagram showing a third embodiment of the configuration of the signal processing part to which the present invention is applied.

FIG. 23 is a block diagram showing a third embodiment of the configuration of the signal processing part 128 to which the present invention is applied. The blocks to which the same reference numerals as those in the past configuration in FIG. 17 and the first embodiment in FIG. 21 are given are the blocks for performing the same or similar process as in FIGS. 17 and 21. While the A/D converter 200 in the first embodiment in FIG. 21 performs the A/D conversion process by switching the picture signals of chA, chB and chC for each field, the A/D converter 200 in the third embodiment in FIG. 23 performs the A/D conversion process by switching the picture signals of chA, chB and chC for each horizontal scanning period. For instance, it converts the picture signals of chA from the analog signals to digital signals and outputs them to the HPF 152 in the period from a certain horizontal sync signal (first horizontal sync signal) to the next horizontal sync signal (second horizontal sync signal). Next, it converts the picture signals of chB from the analog signals to digital signals and outputs them to the HPF 152 in the period from the second horizontal sync signal to the next horizontal sync signal (third horizontal sync signal). Subsequently, it converts the picture signals of chC from the analog signals to digital signals and outputs them to the HPF 152 in the period from the third horizontal sync signal to the next horizontal sync signal (fourth horizontal sync signal). Thus, the switching of the channels from the first horizontal sync signal to the fourth horizontal sync signal is repeated so as to output the picture signals of chA, chB and chC converted into digital signals for each horizontal scanning period to the HPF 152.

The picture signals of chA, chB and chC outputted for each horizontal scanning period from the A/D converter 200 have the high frequency components thereof extracted by the HPF 152 as described as to the configuration in the past in FIG. 17. Only the signals in the AF frame (refer to FIG. 18) are extracted and outputted by the gating circuit 154. The picture signals of chA processed and outputted from the gating circuit 154 are inputted to the adder 156, and the picture signals of chB processed and outputted from the gating circuit 154 are inputted to the adder 166. The picture signals of chC processed and outputted from the gating circuit 154 are inputted to the adder 176. Thereby, the signals equivalent to one field outputted from the gating circuit 154 are added by the adder 156, 166 and 176, respectively, where the focus evaluation value of chA is acquired by the adder 156, the focus evaluation value of chB is acquired by the adder 166, and the focus evaluation value of chC is acquired by the adder 176. The focus evaluation values of chA, chB and chC acquired by the adder 156, 166 and 176, respectively, are given to the CPU 182 for each field.

Thus, it is also possible, with the common processing part, to process the picture signals of the channels by the time-sharing for each horizontal scanning period so as to miniaturize the circuit scale of the signal processing part 128 as with the first embodiment or the like.

In case of processing the picture signals of the channels by the time-sharing for each horizontal scanning period as with the third embodiment, the positions of horizontal scanning lines to be actually processed for the picture signals of chA, chB and chC are different. In order to prevent this, it is possible to stagger the times for the vertical sync signals of the image pickup devices A, B and C by one horizontal scanning period according to the order of the channels to be processed by the A/D converter 200 so as to have the picture signals of all the channels processed for the same horizontal scanning line position. To be more specific, for the sake of time-sharing process, it is possible to delay the timing of the vertical sync signal of the picture signal of a certain channel by time length for which the process of the picture signals of the other channels delays against that picture signal so that, in the time-sharing process, the scanning line position to be processed and the scanning line position not to be processed may be not different among the channels.

Figure 24:
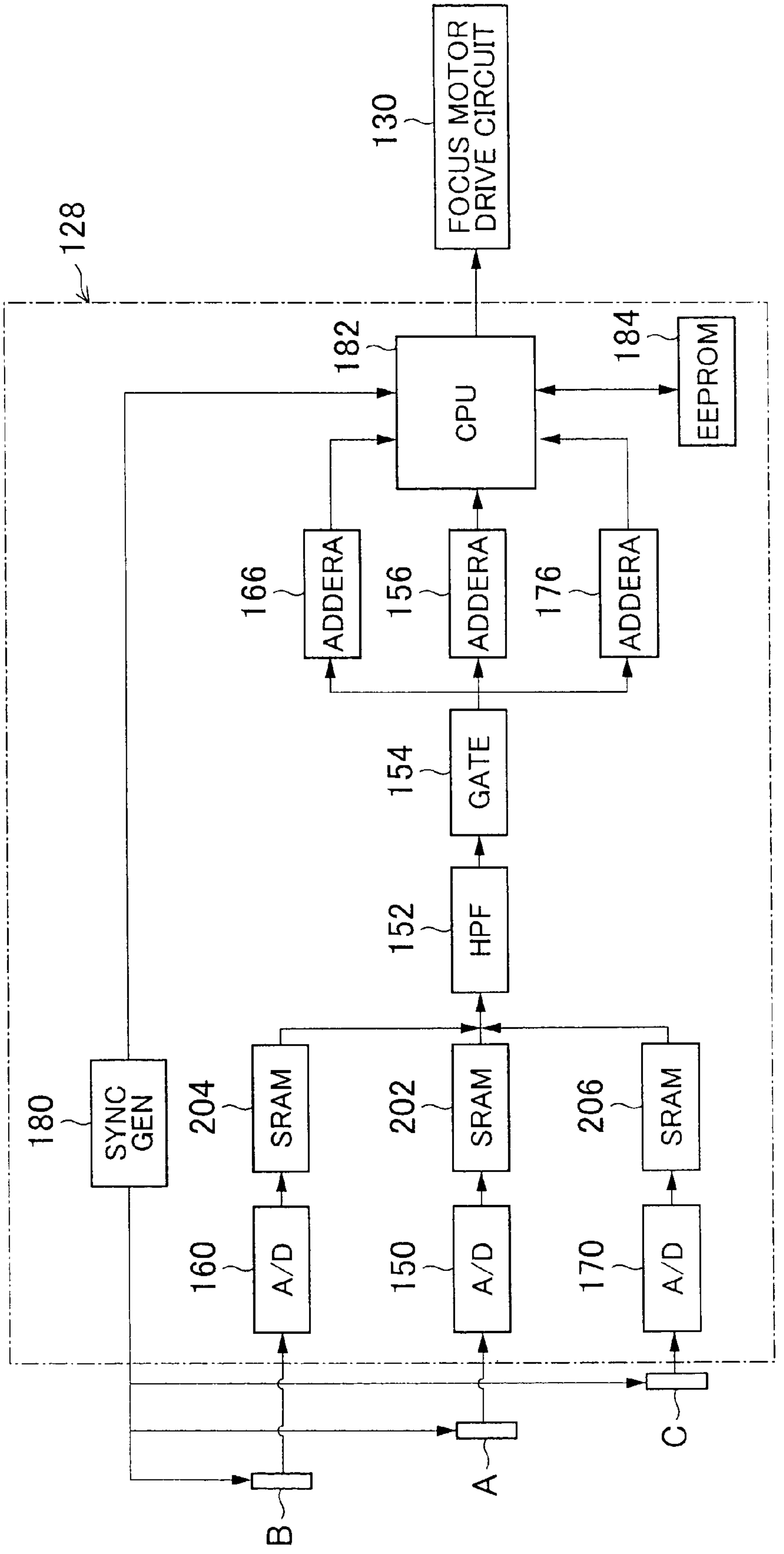
FIG. 24 is a block diagram showing a fourth embodiment of the configuration of the signal processing part to which the present invention is applied.

FIG. 24 is a block diagram showing a fourth embodiment of the configuration of the signal processing part 128 to which the present invention is applied. The blocks to which the same reference numerals as those in second embodiment the in FIG. 22 and the third embodiment in FIG. 23 are given are the blocks for performing the same or similar process as in FIGS. 22 and 23. As for the fourth embodiment in FIG. 24, the process from the HPF 152 onward matches with the process from the HPF 152 onward in the third embodiment in FIG. 23. On the other hand, according to the fourth embodiment in FIG. 24, the picture signals of chA, chB and chC outputted from the image pickup devices A, B and C are converted into the digital signals by the A/D converters 150, 160 and 170 individually provided as with the second embodiment in FIG. 22 (the past configuration in FIG. 17). Thereafter, the picture signals equivalent to one horizontal scanning period outputted from the image pickup devices A, B and C at the same time are stored in the SRAMs 202, 204 and 206, respectively. The picture signals equivalent to one horizontal scanning period stored in the SRAMs 202, 204 and 206 are outputted to the HPF 152 in the predetermined order, respectively. The timing for the vertical sync signals of the image pickup devices A, B and C matches up.

For instance, the picture signals equivalent to one horizontal scanning period of chA stored in the SRAM 202 are outputted to the HPF 152 first, and the picture signals equivalent to one horizontal scanning period of chB stored in the SRAM 204 are subsequently outputted to the HPF 152. Next, the picture signals equivalent to one horizontal scanning period of chC stored in the SRAM 206 are outputted to the HPF 152. Thus, it is possible, by storing in the memory the picture signals outputted from the image pickup devices A, B and C at the same time, to obtain the focus evaluation values of chA, chB and chC based on the picture signals at the same horizontal scanning line position obtained by having their images picked up on the image pickup devices A, B and C at the same time.

The channels are switched for each horizontal scanning period so as to process the picture signals in one processing part in the third embodiment in FIG. 23 and the fourth embodiment in FIG. 24. However, it is also feasible to switch the channels each time it finishes processing the picture signals at least necessary at the time of seeking the focus evaluation values, that is, the picture signals in the AF frame (refer to FIG. 18). The processing contents to be processed by the time-sharing in one processing part may be different from those in the third and fourth embodiments, and the present invention is applicable to the case where all or a part of the process performed to the picture signals is processed by the time-sharing in one processing part. In particular, it is also effective to perform only the process of the HPF 152 by the time-sharing in one processing part and perform the process other than that in an individual processing part of each channel.

The above embodiments were described as to the cases of applying the present invention to the configuration of the signal processing part 128 having the three focus state determining image pickup devices. However, the present invention is applicable to the cases where there are a plurality of focus state determining image pickup devices, not limited to three.

It is also possible to combine the matter described in FIGS. 1 to 13 with the matter described in FIGS. 14 to 24 so as to constitute the auto focus system including both the matters.

As described above, the auto focus system according to the present invention has a corrector which makes a correction on the sensitivity of the focus evaluation value obtained from each of the image pickup devices, and so it becomes possible to make an adequate correction on the sensitivity of the focus evaluation values so as to exert the auto focus control with high accuracy. It can also automatically make a correction on the sensitivity of the focus evaluation value so as to eliminate troublesome labor.

All or a part of the auto focus control process using the plurality of image pickup devices placed at the positions of different light path lengths is exerted by the single processing part by the time-sharing so that the circuit scale can be miniaturized and the power consumption can be reduced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An auto focus system, comprising:

a plurality of image pickup devices which pick up images of object light incident on a picture-taking lens and are arranged at positions of different light path lengths;

a focus evaluation value generation device which generates a focus evaluation value indicating a degree of sharpness of the image picked up by each of the image pickup devices;

a corrector which makes a correction on sensitivity of the focus evaluation value obtained from each of the image pickup devices so that the sensitivities match up; and a focus control device which moves a focus of the picture-taking lens to a focusing position according to the focus evaluation values, wherein a value obtained by, for each focus evaluation value obtained from each of the image pickup devices, multiplying a variation of the focus evaluation value from a predetermined reference value by a predetermined gain is the focus evaluation value used for controlling the focus of the picture-taking lens; and the corrector makes a correction on the sensitivity by setting the reference value and the gain at appropriate values, and includes:

a reference value setting device which sets as the reference value the focus evaluation value obtained from each of the image pickup devices in a case where an image having no contrast is picked up; and a gain setting device which sets the gain so that a maximum value of the focus evaluation value obtained from each of the image pickup devices matches up in a case where the focus of the picture-taking lens is moved, wherein, at the time of having the gain set by the gain setting device, the corrector moves the focus in a state in which a zoom of the picture-taking lens is set at a predetermined position.

2. The auto focus system according to claim 1, wherein the corrector automatically makes a correction on the sensitivity at least one of at a time of turning on a predetermined switch, at power-on, and on initialization before shipment.

3. The auto focus system according to claim 1, further comprising an indicator which indicates that the corrector is just making a correction on the sensitivity.

4. The auto focus system according to claim 1, wherein the corrector stores the reference value and gain set by the reference value setting device and the gain setting device as correction data in a memory.

5. The auto focus system according to claim 1, wherein the reference value setting device has the image having no contrast picked up by each of the image pickup devices by closing an iris of the picture-taking lens.

6. The auto focus system according to claim 1, wherein the gain setting device moves the focus of the picture-taking lens at high speed to check existence of the maximum value of the focus evaluation value obtained from each of the image pickup devices, and then moves the focus at a low speed to accurately determine the maximum value.

* * * * *

UNITED STATES PATENT AND TRADEMARK OFFICE

CERTIFICATE OF CORRECTION

PATENT NO. : 7,345,706 B2
APPLICATION NO. : 10/642143
DATED : March 18, 2008
INVENTOR(S) : Atsushi Kanayama et al.

It is certified that error appears in the above-identified patent and that said Letters Patent is hereby corrected as shown below:

Title page Item [73] should read:

(73) Assignee: Fujinon Corporation, Saitama (JP)

Signed and Sealed this

Fourteenth Day of July, 2009

JOHN DOLL

*Acting Director of the United States Patent and Trademark Office*